(12) United States Patent
Lawrence

(10) Patent No.: US 10,861,096 B1
(45) Date of Patent: Dec. 8, 2020

(54) METHOD AND APPARATUS TO CROWD BOOTSTRAP AN ACCELERATOR

(71) Applicant: Mark Lawrence, Monrovia, CA (US)

(72) Inventor: Mark Lawrence, Monrovia, CA (US)

( * ) Notice: Subject to any disclaimer, the term of this patent is extended or adjusted under 35 U.S.C. 154(b) by 452 days.

(21) Appl. No.: 15/456,543

(22) Filed: Mar. 12, 2017

Related U.S. Application Data

(63) Continuation-in-part of application No. 15/268,591, filed on Sep. 18, 2016.

(51) Int. Cl.
   *G06Q 40/06* (2012.01)

(52) U.S. Cl.
   CPC .................. *G06Q 40/06* (2013.01)

(58) Field of Classification Search
   CPC .... G06Q 10/101; G06Q 10/063; G06Q 90/00; G06Q 40/06; G06Q 30/0279; G06Q 10/067; G06Q 10/103; G06Q 10/06; G06Q 10/0631; G06Q 10/063112; G06Q 10/063118; G06Q 10/06313; G06Q 10/0637
   See application file for complete search history.

(56) References Cited

U.S. PATENT DOCUMENTS

| | | | |
|---|---|---|---|
| 4,670,848 A | 6/1987 | Schramm | |
| 7,249,117 B2 | 7/2007 | Estes | |
| 7,861,252 B2 | 12/2010 | Uszok et al. | |
| 8,548,868 B1 | 10/2013 | Lawrence | |
| 8,694,399 B2 | 4/2014 | Tian | |
| 8,818,926 B2 | 8/2014 | Wallace | |
| 2001/0032157 A1* | 10/2001 | Dannenberg | G06Q 40/04 705/36 R |
| 2002/0138385 A1* | 9/2002 | Milam | G06Q 30/02 705/36 R |
| 2002/0174081 A1 | 11/2002 | Charbonneau | |
| 2004/0024674 A1 | 2/2004 | Feldman | |
| 2010/0280937 A1 | 11/2010 | Hiatt, Jr. et al. | |
| 2012/0136807 A1* | 5/2012 | Bendel | G06Q 40/06 705/36 R |
| 2013/0226688 A1* | 8/2013 | Harvilicz | G06Q 30/02 705/14.39 |
| 2014/0067644 A1 | 3/2014 | Cameron et al. | |
| 2014/0143124 A1 | 5/2014 | Sanders | |
| 2014/0289084 A1* | 9/2014 | Terrell, II | G06Q 40/00 705/35 |
| 2015/0081363 A1* | 3/2015 | Taylor | G06Q 40/00 705/7.14 |
| 2015/0161721 A1 | 6/2015 | Zhou et al. | |
| 2017/0262807 A1* | 9/2017 | Kolls | G06Q 10/101 |

OTHER PUBLICATIONS

U.S. Appl. No. 15/089,553, filed Apr. 14, 2020, Mark Lawrence, Abstract.

\* cited by examiner

*Primary Examiner* — Elda G Milef

(57) ABSTRACT

An accelerator as a service is described where organizations can create an accelerator fund. From that fund the organization can invest sweat equity into selected startups. Those startups use the sweat equity to acquire startup services from experts who receive a participation in the fund. Eventually, shares in the fund are traded on an exchange.

20 Claims, 15 Drawing Sheets

Data Storage System 207

- 601 CCS Database
- 602 Administration Database
- 603 Entrepreneur Database
- 604 Team Member Database
- 605 Contractor Database
- 606 Supplier Database
- 607 Startup Database
- 608 Audit Database
- 609 Terms & Conditions Database
- 610 Lean Roadmap Database
- 611 Matching Rules Database
- 612 Work Order Database
- 613 Excellence Awards Database
- 614 Notification & Messaging Database
- 615 Encryption Database
- 616 Workflow Management Database
- 617 Campaign Database
- 618 Payment Processor Database
- 619 Messaging Database
- 620 Forums Database

Fig. 6

Business Intelligence System 208

- 706 Presentation Layer Module
- 705 Reporting Tools Module
- 704 Data Mining Tools Module
- 703 Analytic Tools Module
- 702 Data Warehouse Module
- 701 ETL Module — Extract, Transform, Load Data

Fig. 7

1101 The system administrator creates a workflow that is the preferred procedure to complete lean startup activities.

1102 The system administrator modifies the workflow that is the preferred procedure to complete lean startup activities.

1103 The system administrator saves the workflow that is the preferred procedure to complete lean startup activities.

1104 The system administrator activates the workflow that is the preferred procedure to complete lean startup activities.

( END )

1105 The entrepreneur logs into the workflow management system and starts the preferred procedure to complete lean startup activities.

1106 The workflow management system opens the procedure to complete lean startup activities.

1107 The workflow management system guides the user through the preferred procedure to complete lean startup activities.

1108 The workflow management system saves the information created at each completed step in the process and also saves drafts for the incomplete steps.

1109 The workflow management system enables the user to resume the preferred procedure until the cycle is complete.

( END )

Fig. 11

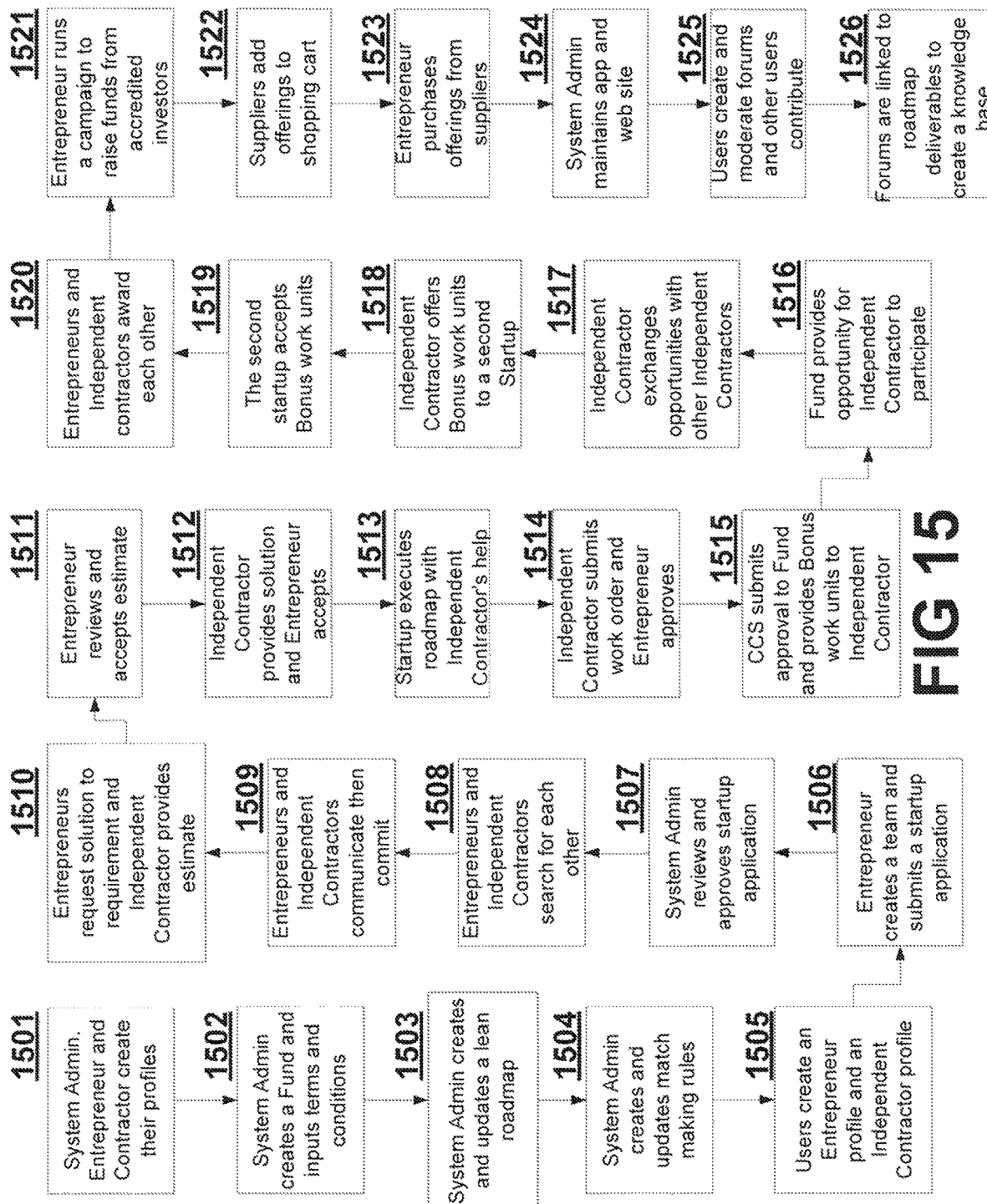

METHOD AND APPARATUS TO CROWD BOOTSTRAP AN ACCELERATOR

CROSS REFERENCE TO RELATED APPLICATION

This application is a continuation in part of application Ser. No. 15/268,591 filed on Sep. 18, 2016 by the present inventor.

This application is related to the following commonly-owned United States Patent Applications; Provisional Patent Application 60/140,479 (Jun. 22, 1999), Provisional Patent Application 60/216,767 (Jun. 7, 2000), application Ser. No. 09/599,673 (Jun. 22, 2000), application Ser. No. 10/716,847 (Nov. 18, 2003), Provisional Patent Application 61/315,977 (Mar. 21, 2010), Provisional Patent Application 61/327,720 (Apr. 26, 2010), Provisional Patent Application 61/361,431 (Jul. 5, 2010), patent application Ser. No. 13/046,775 (Mar. 14, 2011), Utility Patent U.S. Pat. No. 8,527,327, Utility Patent U.S. Pat. No. 8,548,868 and Provisional Patent Application 62/152,819 (Apr. 24, 2015), Provisional Patent Application 62/274,247 (Jan. 2, 2016), Provisional Patent Application 62/274,298 (Jan. 3, 2016), Provisional Patent Application 62/295,135 (Feb. 14, 2016), patent application Ser. No. 15/089,553 (Apr. 3, 2016), Provisional Patent Application 62/360,427 (Jul. 10, 2016), patent application Ser. No. 15/268,591 (Sep. 18, 2016) and patent application Ser. No. 15/268,623 (Sep. 18, 2016).

This application is also related to the following commonly-owned International Patent Applications; WO 00/79350 (Dec. 28, 2000), WO 02/05138 (Jan. 17, 2002), and PCT/US00/17247 (Jun. 22, 2000).

The workflow management system taught herein is a part of the present invention and is a new use of the Process Automation Software taught in application Ser. No. 10/716,747 (Nov. 18, 2003).

The skills survey taught herein is a part of the present invention and is a new use of the interview questionnaire system taught in co-owned patent application Ser. No. 15/089,553 (Apr. 3, 2016).

The buyer demand system taught herein is a part of the present Invention and is a new use of the aggregate demand system for buyer specified goods and services taught in utility patent U.S. Pat. No. 8,548,868.

FEDERALLY SPONSORED RESEARCH

None.

SEQUENCE LISTING

None.

BACKGROUND OF THE PRESENT INVENTION

1.1) Field of the Invention

This invention relates generally to the field of startup recruitment.

1.2) Background

According to the article "The Importance of Young Firms for Economic Growth" by Jason Wiens and Chris Jackson, new and young companies are the primary source of job creation in the American economy. In fact, companies that are less than one-year-old have created an average of 1.5 million jobs per year over the past three decades. Moreover, from 2006 to 2009, young and small firms (fewer than five years old and twenty employees) were a positive source of net employment growth (8.6 percent), whereas older and larger firms eliminated more jobs than they created. In addition, young firms provide economic dynamism by injecting competition into markets and spurring innovation. However, the rate at which new businesses are opening has been steadily declining until 2014. According to Census data, new firms represented as much as 16 percent of all firms in the late 1970s. By 2011, that share had declined to 8 percent. This contributed to the gross number of jobs created by new firms falling by more than two million between 2005 and 2010.

To reverse this trend, innovation and changes are required to encourage and nurture startups. Startups require people, products, services, plans, equipment, advisors, mentors, etc. and funding is usually required to pay for these resources. In addition, startups have a lot of uncertainty that funding can also help mitigate. Funding is therefore required to start and maintain the operations of most startups. Entrepreneurs have a number of options for funding including personal finances, friends and family, accelerators, angel investors, venture capitalists, debt financing, equity financing, customer financing and government-sponsored programs. However, many potential startups cannot attract the funding or have the knowledge to make progress from the idea stage to product launch. To facilitate this process, a number of startup accelerators and business incubators have been launched.

According to Forbes incubators and accelerators have become an increasingly important part of the tech startup scene in recent years. These programs provide new entrepreneurs with mentorship, advice and practical training on technical, business and fundraising topics to help them get from idea to product to launch and beyond. An accelerator usually provides a small amount of capital and mentorship to entrepreneurs and usually receives less than 10% of the startup's equity. An accelerator's program typically lasts for three to four months and culminates in a public pitch event or demo day. Conversely, an incubator develops their own business ideas then hires an external management team to launch and run the business. Incubator startups usually gestate for much longer periods of time than an accelerator and an incubator typically takes a much larger equity stake than an accelerator.

The Internet, smartphones and lean startup concepts have dramatically reduced the cost to start a company. In addition, the Internet provides unprecedented distribution for startups. After a product is launched on the Internet, it immediately has access to global markets. Smartphones allow products and services to be launched as low cost "apps" that can leverage the Internet's low cost global distribution channel. The lean startup movement further reduces startup costs by focusing limited startup resources on the minimal path from idea to successful launch.

However, driving down startup costs from millions of dollars to hundreds of thousands still leaves some entrepreneurs on the sidelines. They cannot afford resource costs, product development costs, and execution costs. Many entrepreneurs could bootstrap their startup without having to raise a significant amount of funding if they had free access to the broad range of startup resources and the knowledge they need. They need developers, product designers, marketing expertise, business development, sales, accounting, legal services, etc. which all typically demand compensation making bootstrap strategies almost impossible.

None of these disclosures, or any other prior art, teaches a market where an entrepreneur can bootstrap a startup, by accessing a very large community of subject matter experts on demand, without funding, to help complete almost any task required to execute the startup's business plan. Also, where startups can pool resources such as negotiating power and technical sub-components that comprise their solutions to minimize development costs and can also minimize operating costs by executing a proven lean startup process that focuses scarce resources on the minimum number of critical activities required to progress from idea to launch.

Accordingly, there is a need for a bootstrapping market where a community of entrepreneurs, suppliers and experienced independent contractors are organized and reorganized as a temporary crowd to help accelerate the launch of each startup; where independent contractors have an incentive to provide services at little or no cost to the startup; where the first version of each solution is created from reusable technical building blocks that are developed and redeveloped by the startup community; and where a lean startup process is continually improved, and executed by entrepreneurs, and that lean startup process focuses the scarce resources of each startup on the most efficient activities required to guide the startup team from idea to launch.

The applicant is not aware of any other commercially viable system that addresses the shortcomings of the prior art and also includes the features stated above. It is therefore an object of the present invention to set forth a system that offers entrepreneurs an option to bootstrap their startup from idea to launch by minimizing costs for resources, product development and lean execution.

It is an object of the present invention to enable entrepreneurs, team members and independent contractors, skilled in individual steps in the preferred lean startup process, to sign up and create a profile that includes their needs, preferences and capabilities.

It is yet another object of the present invention to enable an entrepreneur to form a team of permanent and temporary team members then collaborate to complete each step in the lean startup process.

It is a further object of the present invention to enable entrepreneurs to submit a startup idea and for the system administrator to accept or reject that startup.

It is another object of the present invention to enable the system administrator to review, assess, score, prioritize and accept startups.

It is a further object of the present invention to provide and update an optimal lean startup process for startups to execute comprised of a predetermined sequence of deliverables at each step in the lean startup process.

It is another object of the present invention to enable each entrepreneur to modify the default lean startup process to match the specific needs of their specific startup.

It is another object of the present invention to match startups and independent contractors, who offer specific subject matter expertise.

It is object of the present invention to enable startups and independent contractors to search for each other then request and accept offers to collaborate.

It is a further object of the present invention to enable startups to share resources and knowledge including sharing reusable subcomponents of their solutions.

It is yet another object of the present invention to enable entrepreneurs to reward excellent performance by independent contractors and for independent contractors to reward excellent performance by entrepreneurs.

It is yet another object of the present invention to enable entrepreneurs to run a campaign to raise funds to meet specific startup costs.

It is an object of the present invention for independent contractors to complete work orders to track their effort and for entrepreneurs to approve those work orders.

It is an object of the present invention to be organized as a fund and provide a startup the rights to acquire effort and solutions from any member independent contractor.

It is another object of the present invention to enable independent contractors to provide a startup the rights to acquire effort and solutions from any member independent contractor.

It is yet another object of the present invention to enable each independent contractor who provides support for a member startup to acquire rights to an interest in the fund and swap those rights.

It is an object of the present invention to enable users to create a discussion forum to share knowledge on specified topics.

These and other objects of the present invention will be apparent to those skilled in the art from the following detailed description of the present invention, the accompanying drawings and the appended claims.

SUMMARY OF THE PRESENT INVENTION

In a preferred embodiment, the present invention provides a method and apparatus for users to:

Create a fund that helps entrepreneurs access startup resources on demand.

Create and update the preferred lean startup procedure to bootstrap a startup, comprised of an optimal sequence of startup milestones and deliverables.

Create a profile that includes key entrepreneur and independent contractor information including bio, role, target industry, preferred startup stage, experience, skills, interests, location, conflicts of interest, expectations, constraints, notification preferences and availability.

Submit a startup idea and startup meta data, including bios of existing team members, stage, status, plans, IP, traction, needs and support required.

Search for startups and search for independent contractors then request and accept offers to collaborate.

Form a team of permanent and temporary team members.

Collaborate with team members to complete each step in the process of product and service development, marketing, sales and distribution.

Submit work orders for deliverables completed and for entrepreneurs to approve the work orders.

Receive matching work order credits (bonus work units) for approved work orders that the independent contractor can donate to any member startup.

Receive rights to acquire an interest in the fund for support provided to member startups by member independent contractors.

Share resources among startups, specifically reusable subcomponents that reduce the time and effort to create a functional prototype.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 illustrates a first embodiment of the data storage system ("DSS") for the present invention.

FIG. 7 illustrates a first embodiment of the business intelligence system ("BIS") of the present invention.

FIG. 11 illustrates a first embodiment of the workflow procedure for the workflow management system ('WMS') of the present invention.

FIG. 15 illustrates a first embodiment of the high level business procedure for the present invention.

DETAILED DESCRIPTION OF THE INVENTION

With reference to the figures, exemplary diagrams of key components of the present invention are provided in which illustrative embodiments may be implemented. It should be appreciated that these figures are only exemplary and are not intended to assert or imply any limitation with regard to the components in which different embodiments may be implemented. Many modifications to the depicted components may be made.

System Overview

Figure 1:
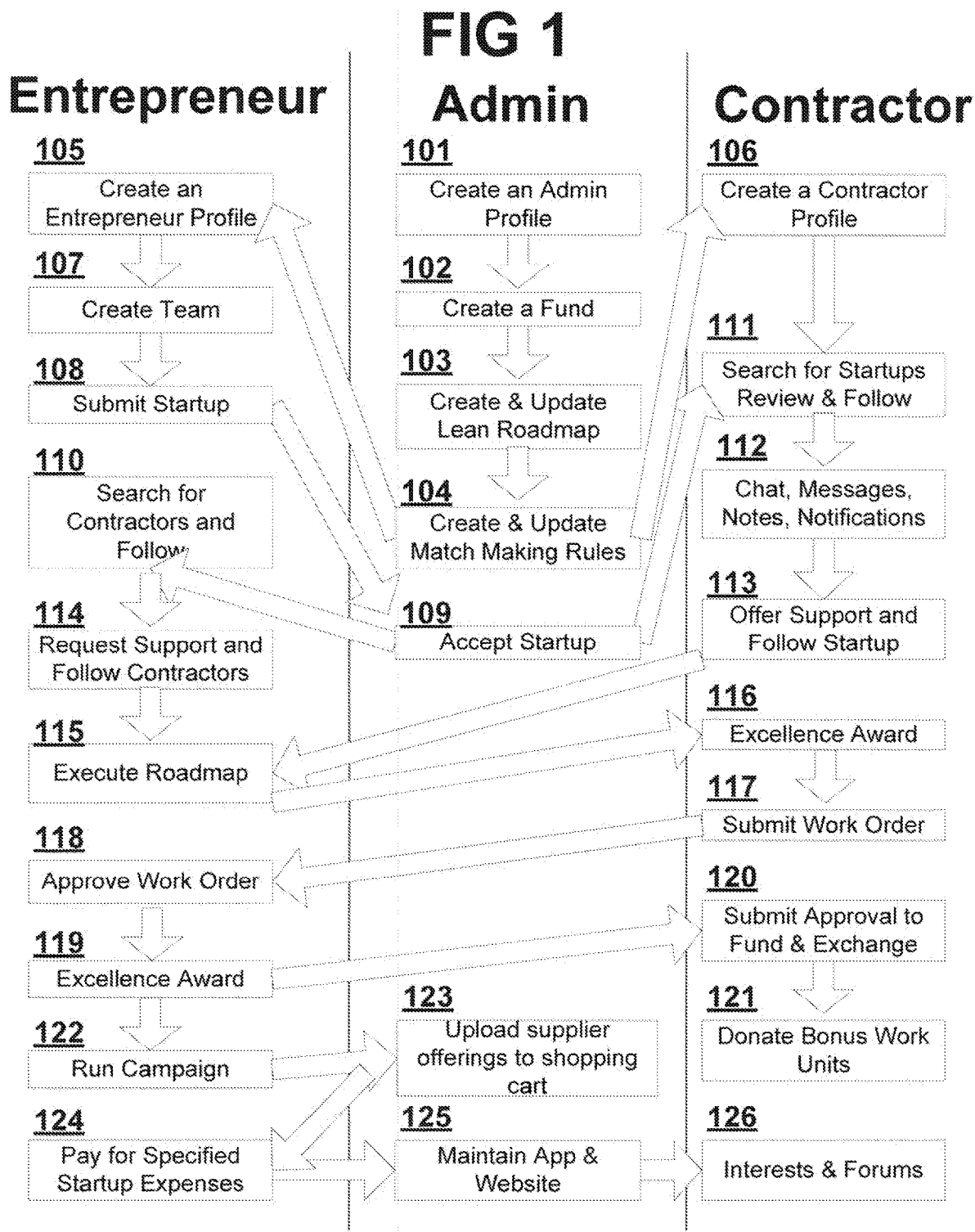
FIG. 1 illustrates a first embodiment of an overview of the present invention.

In an overview of the first embodiment illustrated in FIG. 1, the present invention provides a method and apparatus for entrepreneurs to elicit support from a crowd of independent contractors who perform like an independent workforce of subject matter experts. For example, when executing the lean startup procedure, the entrepreneur may decide to develop an app. Each member of a group of independent contractors, selected by the entrepreneur, provides a vital role in developing the app, such as market research, gathering requirements, design, development, testing, etc. The entrepreneur leverages the knowledge of the crowd to accelerate ideation, product development, marketing and sales. The entrepreneur leverages this crowd acceleration concept for each key deliverable, such as a business plan, requirements, design, development, testing, marketing plan, market entry strategy, etc.

The present invention enables a system administrator 101 to sign up and create a profile. The system administrator then creates a fund by inputting the terms and conditions that describe the governance rules of the fund, the performance expectations of the startup, the benefits for the stakeholders in the fund and the operating fees for the fund 102. The fund provides a number of work units to each accepted startup that the startup can use to attract assistance from independent contractors.

The system administrator creates the default lean roadmap which is the preferred procedure to start a startup. This preferred procedure is comprised of the minimal number of activities required to validate the business model, build the minimal viable product then gain the first customers 103. The system operator has worked with a number of startup experts to determine the preferred procedure (e.g., sequence of lean activities) to start a startup. The goal of this preferred procedure is to minimize startup costs and accelerate the timeline from idea to customer acquisition.

The system administrator then creates and updates match making rules. The match making rules compare the needs of each startup with the skills and interests of each independent contractor. If a match is identified, then the present invention notifies the matching entrepreneur and independent contractor 104.

When each user signs up they can create an entrepreneur profile 105. The entrepreneur inputs a multitude of information, including their bio and information about their startup. When each user signs up they can also create an independent contractor profile 106. The independent contractor inputs a multitude of information, including their skills and interests.

The entrepreneur can create a team by inviting independent contractors to be team members then giving them team member permissions. This is by private invitation because the startup is not yet published on the present invention 107. The present invention allows team members to collaborate to create the deliverables specified in the lean startup roadmap. One of these deliverables is an application form that the entrepreneur can submit to apply to become an official published startup on the present invention 108. The application form includes a multitude of information, including a description of the startup and a summary of its needs. The system administrator then reviews and accepts the entrepreneur's application 109.

The entrepreneur can search for independent contractors and follow their posts in the present invention's forums 110. After the system administrator accepts a startup 109, its profile becomes visible to all independent contractors who can search for and follow the startup 111. By following a startup, an independent contractor can see all of its public posts. If an independent contractor wants more information about a startup or an entrepreneur wants more information about an independent contractor, they can exchange information using a number of means, including chat and messages. They can also save notes about each other and setup notifications 112. The independent contractor can offer support to a startup and add the startup to their profile if the entrepreneur accepts 113. Similarly, the entrepreneur can request support from an independent contractor and add the independent contractor to the extended startup team if that independent contractor accepts 114. The entrepreneur and the startup team then executes the predetermined tasks in the lean startup roadmap 115. While executing the roadmap, startups will share knowledge and can share reusable subcomponents of their solutions, such as reusable website functionality. The independent contractor can recognize extraordinary performance by the entrepreneur or by members of the startup team by submitting an excellence award 116. The independent contractor can submit, to the entrepreneur, a work order for the deliverables completed for the startup 117. The work order includes the number of work units required for each deliverable. Each deliverable is a solution to a requirement specified by the startup. The entrepreneur can approve the work order submitted by the independent contractor 118. Similarly, the entrepreneur can recognize extraordinary performance by members of the startup team by submitting an excellence award 119. The independent contractor can also submit the approved work order to the fund to receive rights to acquire an interest in the fund, such as an option to acquire a specific class of share in the future 120. The independent contractor also receives work order credits (e.g., bonus work units) for each approved work order that the independent contractor can donate to any startup that has been accepted by the fund 121. Any accepted startup can give bonus work units to an independent contractor after the entrepreneur approves one or more deliverables completed by that independent contractor. The entrepreneur can also run a campaign to raise money for the startup from the fund or from accredited investors 122. The entrepreneur must include campaign documentation that includes details about the campaign including how the funds will be used. The System Administrator can upload offerings from suppliers into the shopping cart 123. The startup can use the proceeds raised by the campaign, or proceeds from any other sources, to meet specified startup expenses 124 including paying for offerings from suppliers.

The system administrator maintains the app and the web site 125. This includes updating the user interface, adding new features, monitoring and improving system performance, configuring the system, making system backups, resolving system issues, developing and implementing system policies and procedures, generating system reports, updating system documentation, etc. Independent contractors can input and update their interests in their profile. They can also create, edit and delete forums 126. A forum is a bulletin board where users can add a series of comments and responses. Each forum has a specific topic and the conversation can be moderated by the user who creates the forum.

System Context

Figure 2:
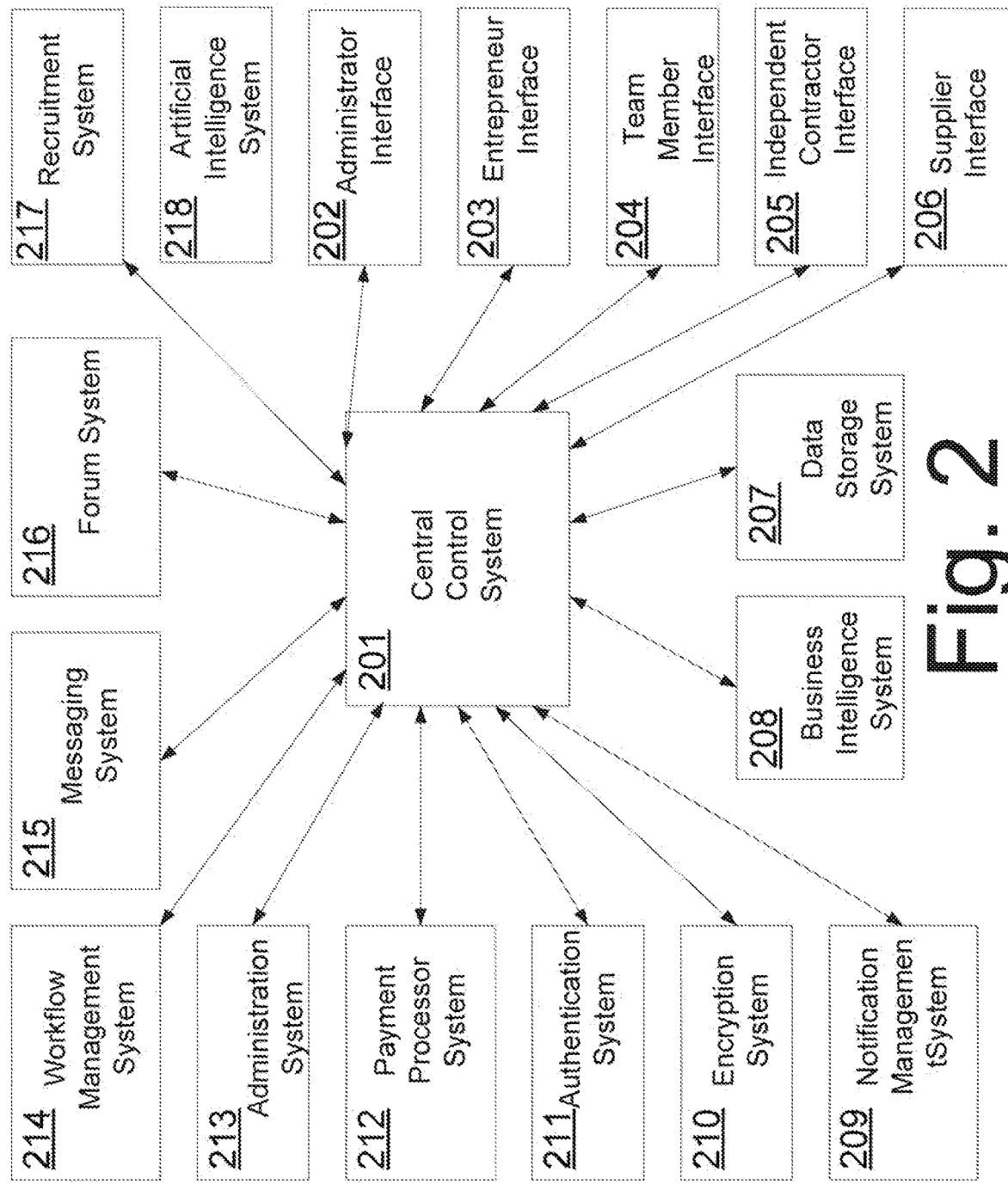
FIG. 2 illustrates a first embodiment of the system architecture of the present invention.

FIG. 2 illustrates the system context of a first embodiment of the apparatus and method of the present invention.

The central control system ("CCS") 201 is operatively coupled to a plurality of other systems and user interfaces. Operative coupling is the preferred procedure to exchange information between systems. In the present invention, the systems are inter-connected via a combination of wide area networks including the public switched telephone network, local area networks, such as an Ethernet network, token ring networks and wireless networks. Most systems, such as modern computers, include a built in interface to a local network, such as an Ethernet or 802.11b wireless network. The communications protocol used by these networks follow an international standard, such as 802.11b, that enables these systems to exchange data using a pre-determined method. However, local area network connectivity only ensures the integrity of data transfer. It is also necessary to specify the information to transfer, its source location and its intended location in the destination system. Each system has its key information stored in pre-determined locations in its database. When the installation engineers configure the interface between two systems they specify the pre-determined location of the required information in the source system's database and the pre-determined location for that information in the destination system's database. The engineers also specify the pre-determined frequency of information transfer (e.g., continuous, every day at 10:00 PM PT), the pre-determined format to use (e.g., synchronous, flat file Extract Transform Load "ETL") and the pre-determined error checking protocol to use. The combination of network connectivity and the configuration of the communication method by installation engineers enable systems to be operatively coupled to the CCS.

The user interfaces are operatively coupled to the CCS 201. The different types of users access the CCS through a plurality of user interfaces. The user interfaces include the system administrator interface 202, the entrepreneur interface 203, the team member interface 204, the independent contractor interface 205 and the supplier interface 206 (collectively "the user interfaces"). The user interfaces are the input and output gateways for communications with the CCS 201.

The data storage system 207 is operatively coupled to the CCS. The data storage system stores the plurality of data used by the present invention.

The business intelligence system 208 is operatively coupled to the CCS. The business intelligence system calculates and stores a plurality of information about trends, patterns and relationships in the databases used by the present invention.

The notification management system 209 is operatively coupled to the CCS. The CCS sends an alert to the notification management system whenever an event occurs that requires the attention of a user or other entity. For example, after an independent contractor offers support to a startup the CCS will instruct the notification management system to alert the relevant entrepreneur by sending an email, text message or alternative notification.

The encryption system 210 is operatively coupled to the CCS. The encryption system enables a symmetric encryption key, public encryption key and private encryption key to be generated for each user or transaction. It also provides an algorithm that is used to encrypt and decrypt information. It supports a multitude of encryption techniques including symmetric encryption that uses the same key to encrypt and decrypt information as well as asymmetric encryption that uses a public encryption key to encrypt information and a private encryption key to decrypt the same information.

The authentication system 211 is operatively coupled to the CCS. The authentication system enables a user to authenticate whether they have rights to access secure information.

The payment processor system 212 is operatively coupled to the CCS. The payment processor system enables payments to be transferred from buyer to seller. A number of service providers offer payment processor systems that can be used by the present invention, such as WePay and Stripe.

The administration system 213 is operatively coupled to the CCS. The administration system enables a user to administer the CCS. For example, the system administrator can use the administration system to update the look, feel and content of the web and mobile interfaces. The administration function also provides forum services that support community discussions and enables technical support and maintenance functions for the present invention.

The workflow management system 214 is operatively coupled to the CCS. The workflow management system enables the system administrator to create and evolve the default lean startup roadmap. It also allows entrepreneurs to customize the lean startup roadmap to meet the unique needs of their startup.

The messaging system 215 is operatively coupled to the CCS. The messaging system enables users to exchange communication messages in real time. For example, an entrepreneur can send a question to an independent contractor and that independent contractor can respond immediately. In addition, multiple team members and independent contractors can participate in a group conversation using real time messaging where they can exchange communications in multiple formats including text and files.

The forum system 216 is operatively coupled to the CCS. The forum system enables users to create a bulletin board where multiple users can exchange communication messages about a topic specified by the user who created the forum. For example, an entrepreneur may be facing a challenge related to encryption. That entrepreneur can create a forum to explain the challenge. Independent contractors with the relevant expertise can respond with information to help resolve the challenge. Forums allow users to exchange information in multiple formats including text and files. Web hosts such as GoDaddy and Host Gator provide forum solutions that can be used by the present invention. For example, GoDaddy's Website Builder solution supports forums. Other forum software solutions that can be used by the present invention include MyBB, pphbb and punbb.

The recruitment system 217 is operatively coupled to the CCS. The recruitment system enables users to setup skills based questionnaires. Those questionnaires can be comprised of multiple choice questions that facilitate both self-service interviews and automated scoring of the answers. Alternatively, non-multiple choice questions can be scored manually or a third party natural language artificial intelligence procedure can be used to score the answers. After each interview, the scores are summarized into a percentage of the total possible score for each skill in a skills summary. Clients can compare the skills summary for an interviewee with the target skills profile for the available job to facilitate hiring recommendations.

The artificial intelligence system 218 is operatively coupled to the CCS. The artificial intelligence system understands a natural language statement and makes a response to that statement based upon at least a partial interpretation of the statement. The recruitment system presents a question, the interviewee offers an answer, the artificial intelligence system understands the answer enough to match it with a database of answers then makes a response usually in the form of a score. A number of artificial intelligence systems are available that can meet the needs of the present invention such as the one taught in U.S. Pat. No. 4,670,848A.

Figure 3:
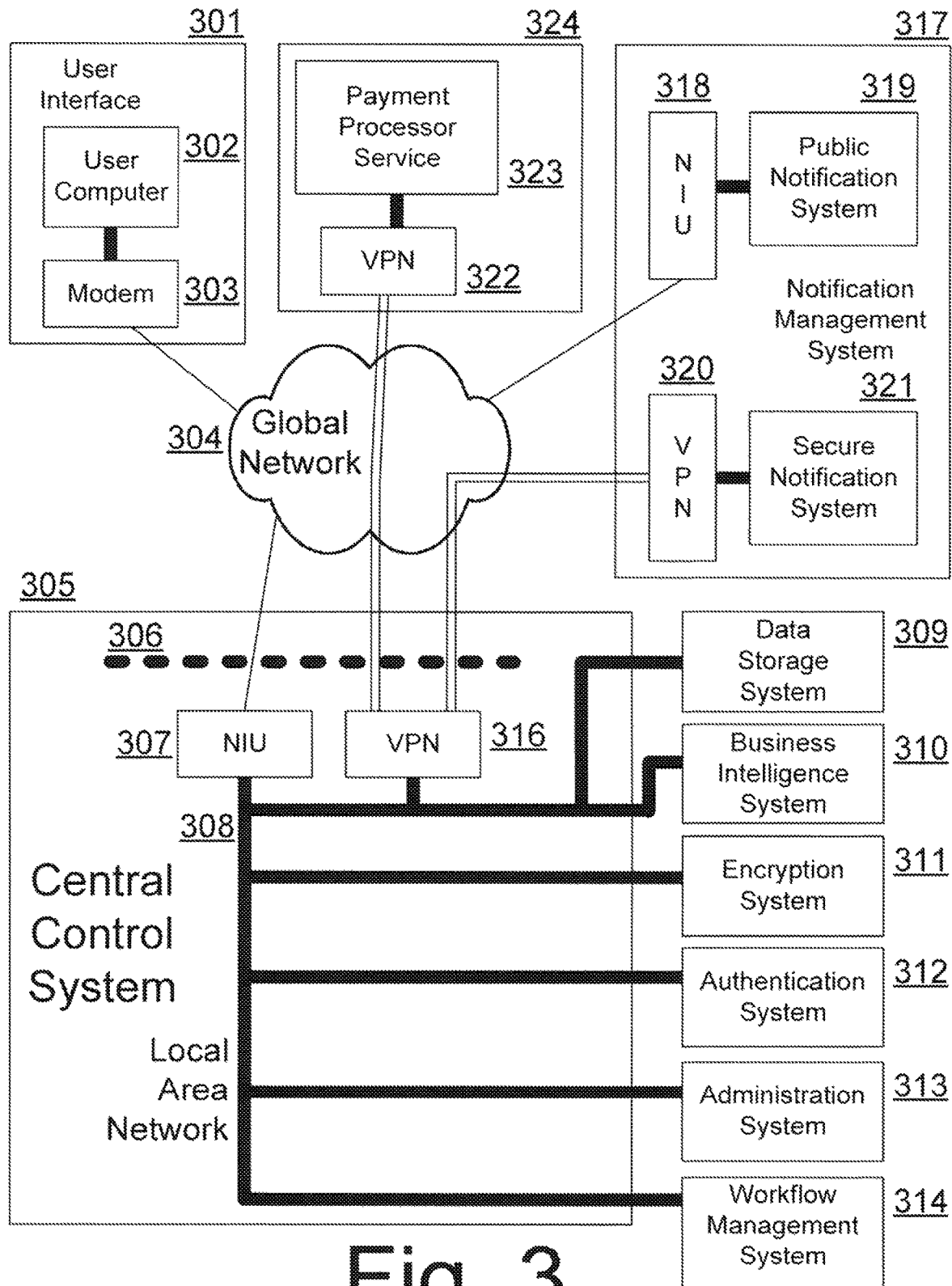
FIG. 3 illustrates a first embodiment of the integration among the central control system and key components of the present invention.

FIG. 3 illustrates the network connectivity of a first embodiment of the apparatus and method of the present invention.

The user interfaces 301 include a computer 302 and a modem 303. Many companies make mobile and desktop computers that a user can use to access the CCS including Apple, Samsung, Hewlett Packard, and Toshiba. In addition, many companies make modems that can connect to the CCS including 3Com Corp., D-Link Systems, Inc., and US Robotics. The user's computer is connected to the CCS via the modem and a Global Network 304, such as the Internet. The user's modem can be connected to the Global Network using at least one of a plurality of services including public or private networks such as the public switched telephone network, dedicated data line, cable service, cellular service, WiFi service, personal communication system ("PCS"), satellite network, and a microwave connection. These types of connections are provided by a plurality of organizations including local and regional telephone operating companies, cable TV companies and other providers of private and public networks.

The CCS 305 includes a local area network 308 that is connected to the global network 304 via a network interface unit ("NIU") 307 and a firewall 306. The CCS is also connected to other systems via the local area network 308 including the Data Storage System 309, Business Intelligence System 310, Encryption System 311, Authentication System 312, Administration System 313, and the Workflow Management System 314.

The CCS 305 also includes a Virtual Private Network ("VPN") modem 316 that is connected to the Secure Notification System 321 and the Payment Processor System 323. Many companies make VPN modems that can be used with the present invention including Netgear, Linksys and Cisco. The Secure Notification System 321 is connected to the CCS via the Global Network using a Virtual Private Network modem 320. In addition to the Secure Notification System 321, the Notification Management System 317 includes a Public Notification System 319. The Public Notification System 319 is connected to the Global Network using a Network Interface Unit 318. The preferred embodiment of the present invention can use a plurality of Public Notification Systems including email services and mobile services. The present invention can operate with many such email services including Yahoo, Hotmail and Gmail. Many organizations provide such email services including Yahoo, Microsoft and Google. The Payment Processor System 324 includes a Payment Processor Service 323 that is connected to the Global Network via a VPN modem 322. Many organizations provide such Payment Processor Services that can be used with the present invention including Paypal, Western Union, WePay, Stripe and Verisign.

Figure 4:
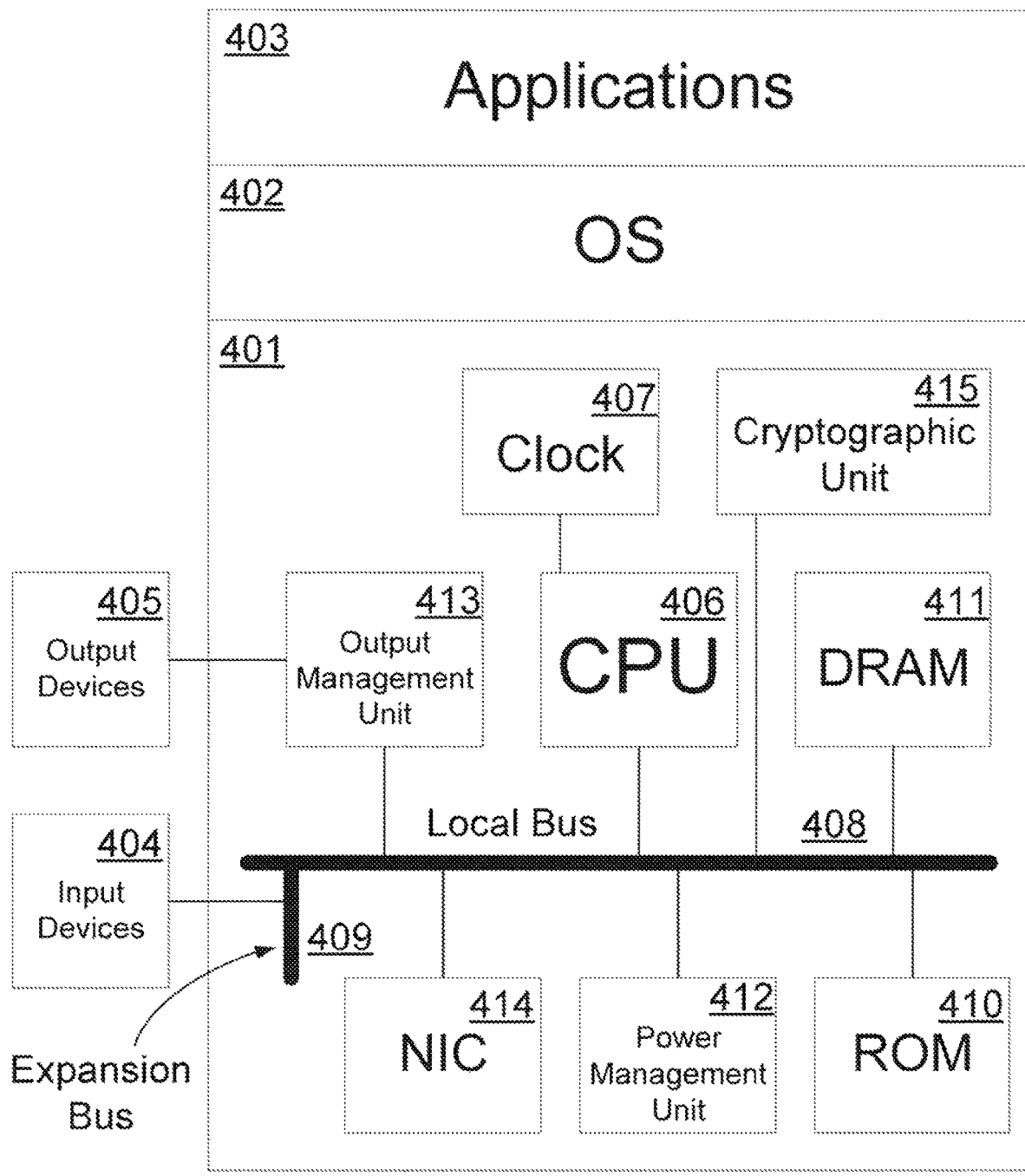
FIG. 4 illustrates a first embodiment of the technical platform for the central control system of the present invention.

FIG. 4 illustrates the key components of the CCS in a first embodiment of the apparatus and method of the present invention.

The Central Control System ("CCS") includes a number of key components including the main hardware 401, the operating system 402, software applications 403, input devices 404 and output devices 405. The operating system 402 is the interface between the applications and the hardware. It controls the execution of computer applications and provides services to those applications. The preferred embodiment of the present invention can use one of a plurality of standard commercial operating systems, such as Microsoft windows, Linux and UNIX. The applications 403 include software tools such as commercial anti virus software available from companies such as McAfee and Norton, and a browser, such as Microsoft Internet Explorer, Chrome and Firefox. The CCS also includes some unique code that implements some of its unique functions described in this disclosure, such as coordinating data interchange among the different systems illustrated in FIG. 2. This unique code can be programmed using one or more standard programming languages including java, javascript, PHP, HTML, C, C+, and visual basic. Input devices 404 include a plurality of commercial options such as a smartphone, keyboard, a camera, a mouse, and a microphone. Output devices 405 include a plurality of commercial options such as a smartphone, monitor and speakers. These standard commercial input devices 404 and output devices 405 are available from a plurality of vendors such as CompUSA and Office Depot.

The main hardware 401 in the CCS can be a conventional smartphone or personal computer or a conventional server with sufficient memory and processing power. To one skilled in the art, it will be evident that the functionality of the CCS can be distributed over multiple inter-connected smartphones, multiple inter-connected personal computers or multiple inter-connected servers. The main hardware includes a number of key components including the central processing unit ("CPU") 406, clock 407, local bus 408, expansion bus 409, read only memory ("ROM") 410, dynamic random access memory ("DRAM") 411, power management unit 412, output management unit 413, network interface card 414 and cryptographic unit 415.

The central processing unit ("CPU") 406 is the component of the CCS that performs most of the data processing. It interprets instructions, performs logical and arithmetic operations on data, and controls input and output functions. The preferred embodiment of the present invention can use a commercial CPU from a plurality of vendors, such as a Pentium G3258 supplied by Intel and the FX-9590 supplied by AMD. The clock 407 regulates the rate at which the CPU processes instructions. The CCS also uses the clock to synchronize the operation of its key components. A CPU such as a Pentium G3258 can operate at a clock speed of 3.2 GHz. The CCS uses the local bus 408 to inter-connect its key components. These key components exchange data via the local bus. The CCS uses the expansion bus 409 to enable expansion cards to exchange data with the CPU and memory. Examples of commercial expansion cards are sound cards and graphics cards. The expansion bus also enables input devices 404, such as a mouse, to input data that can be used by the key components of the CCS. The read only memory ("ROM") 410 includes the instructions that the CPU executes to perform its basic operations. The vendor of the computer platform that comprises the hardware component of the CCS provides the instructions that are stored in the ROM. When the CCS's power is removed then restored, the instructions in the ROM remain unchanged. The dynamic random access memory ("DRAM") 411 includes instructions that the CPU executes to perform selected tasks. The DRAM also stores the data that is used by the instructions executed by the CPU. When the CCS's power is removed then restored, the information in the DRAM is lost. The CCS uses the power management unit 412 to supply and regulate the power required to operate the key components of the CCS. The CCS uses the output management unit 413 to interface with output devices, such as a monitor. The CCS uses the network interface card ("NIC") 414 to interface with external networks, including an Ethernet network, public switched telephone network and a wireless network. The CCS uses the cryptographic unit 415 to support secure communications with external systems, such as the payment processor system and secure notification management system. The vendor of the computer platform, which is used by the CCS, provides the local bus, expansion bus, ROM, DRAM, power management unit, output management unit, network interface card, clock, CPU and cryptographic unit. Specific components, including the NIC, can be obtained from alternate commercial vendors including CompUSA and Office Depot.

Figure 5:
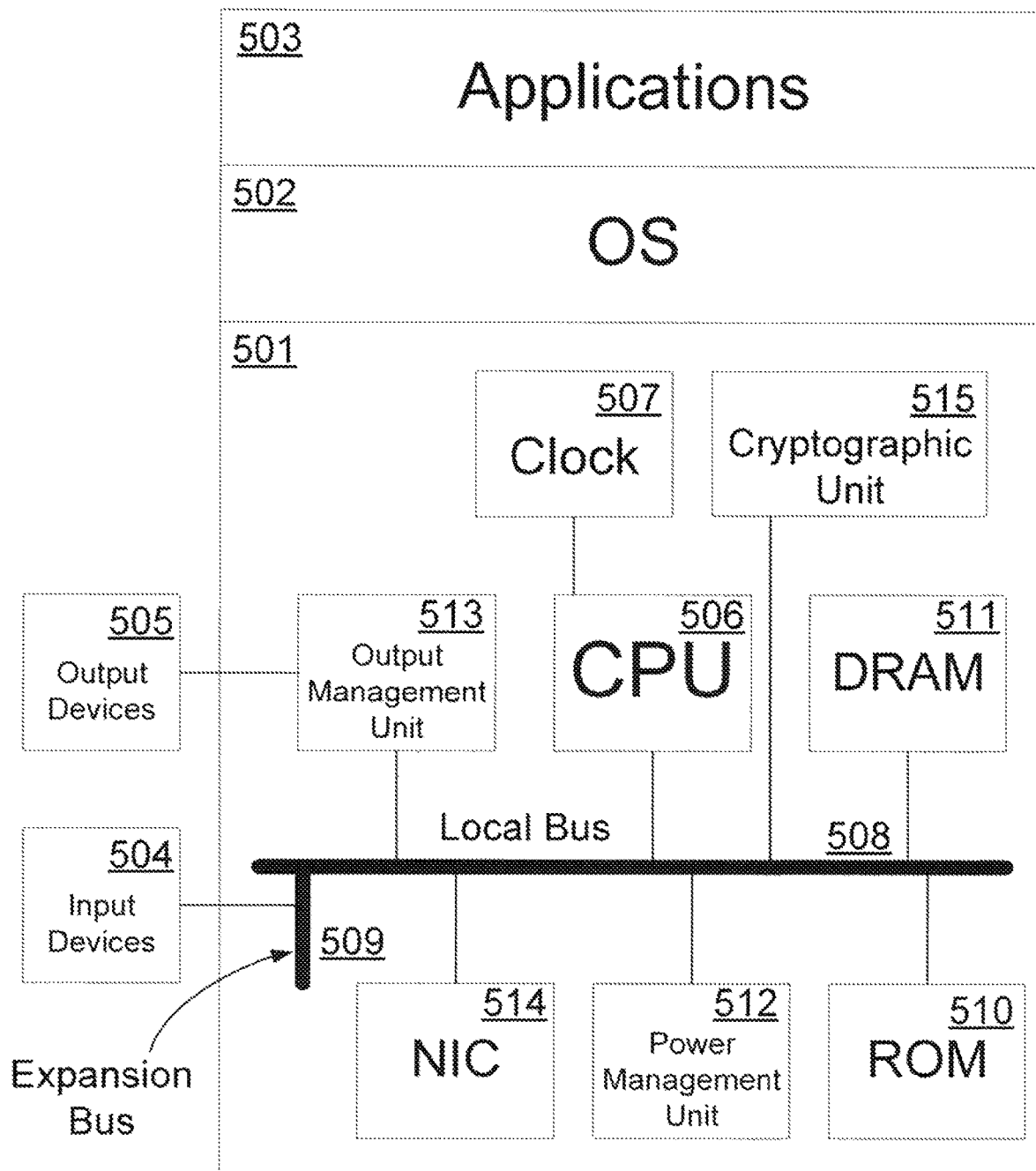
FIG. 5 illustrates a first embodiment of the user interface to the present invention.

FIG. 5 illustrates the key components of the user interface in a first embodiment of the apparatus and method of the present invention.

In a preferred embodiment of the present invention the user interface device 301 is a conventional personal computer that includes, the main hardware 501, the operating system 502, software applications 503, input devices 504 and output devices 505. The main hardware 501 in the user interface device includes a number of key components including the central processing unit ("CPU") 506, clock 507, local bus 508, expansion bus 509, read only memory ("ROM") 510, dynamic random access memory ("DRAM") 511, power management unit 512, output management unit 513, network interface card ("NIC") 514 and cryptographic unit 515. These components are substantially the same as the similarly named components in the CCS as illustrated in FIG. 4. They also perform substantially the same functions and are available from the same vendors. The key differences are that the components in the CCS have higher performance requirements than the equivalent components in the user interface device. In addition, the user interface device includes, commercial software applications such as a word processor application and graphical design application. An example of a word processor application that can be used by the present invention is Microsoft Word. An example of a graphical design application that can be used by the present invention is Microsoft Visio. Examples of higher performance components for the CCS are a faster clock speed, a more powerful CPU and higher capacity DRAM.

FIG. 6 illustrates the key components of the Data Storage System in a first embodiment of the apparatus and method of the present invention.

The data storage system 207 is a conventional hard disk drive that includes non-volatile, magnetic-based hard disk storage that stores digitally encoded data. The data is retained in the data storage system after power is removed then restored. A plurality of suppliers manufacture data storage systems that can be used by the present invention including EMC, Western Digital, Seagate, Maxtor, and Hitachi. The data storage system is comprised of a plurality of databases that are described below. The present invention can use one of a plurality of database systems to house the databases including Oracle and SQL database systems. The CCS stores the data in the Data Storage System in an encrypted format.

The CCS uses the CCS database 601 to store information about how users are using of the CCS. The CCS database contains a plurality of fields including a unique reference key for each record in the CCS database, the unique reference key of each user who has logged into the CCS and tracking information about the functions of the CCS used by each user during each login session.

The CCS uses the administration database 602 to store information about the website, the mobile website, and the mobile application for the CCS as well as information about the maintenance and support of the CCS. The administration database contains a plurality of fields including a unique reference key for each record in the administration database, the type of information, the actual information, and corresponding meta data.

The CCS uses the entrepreneur database 603 to store information about entrepreneurs. For each entrepreneur, the entrepreneur database contains a plurality of fields including a unique reference key for each record in the entrepreneur database, the entrepreneur's identifier, location, contact phone numbers, email address, login credentials for the CCS and information about the entrepreneur's symmetric encryption key, public encryption key, and private encryption key. This information does not give the CCS access to the actual encryption keys.

The CCS uses the team member database 604 to store information about team members. For each team member, the team member database contains a plurality of fields that include a unique reference key for each record in the user database, the team member's identifier, location, contact phone numbers, email address, login credentials for the CCS and information about the team member's symmetric encryption key, public encryption key, and private encryption key. This information does not give the CCS access to the actual encryption keys.

The CCS uses the independent contractor database 605 to store information about independent contractors. For each independent contractor, the independent contractor database contains a plurality of fields that include a unique reference key for each record in the user database, the independent contractor's identifier, location, contact phone numbers, email address, login credentials for the CCS and information about the independent contractor's symmetric encryption key, public encryption key, and private encryption key. This information does not give the CCS access to the actual encryption keys.

The CCS uses the supplier database 606 to store information about suppliers. For each supplier, the supplier database contains a plurality of fields that include a unique reference key for each record in the supplier database, the supplier's unique identifier or name, location, contact phone numbers, email address, login credentials for the CCS and information about the supplier's symmetric encryption key, public encryption key, and private encryption key. This information does not give the CCS access to the actual encryption keys.

The CCS uses the startup database 607 to store information about each startup. The startup database contains a plurality of fields including a unique reference key for each record in the startup database, the name of the startup, the type of startup, the product and services, the industry, the target market, the current status, a unique reference key for the entrepreneur and team members and suppliers, and a unique reference key for the lean roadmap.

The CCS uses the audit database 608 to save and archive transactional information about CCS activities such as collaboration requests between entrepreneurs and contractors. The audit database contains a plurality of fields including a unique reference key for each record, information about each activity performed by the CCS, the time that the activity occurred, and the unique reference key of the person who initiated the activity.

The CCS uses the terms and conditions database 609 to store a plurality of terms and conditions including terms and conditions of the fund, terms and conditions of use, and terms and conditions between each startup and each supplier. The terms and conditions database contains a plurality of fields including a unique reference key for each record, the unique reference key for the corresponding first entity, the unique reference key for the corresponding second entity, date and time stamp, and the actual terms and conditions.

The CCS uses the lean roadmap database 610 to store information about each startup's lean roadmap. The lean roadmap database contains a plurality of fields including a unique reference key for each record, a name for the lean roadmap, a description of the lean roadmap, the unique reference key for the corresponding startup uses that lean roadmap, and the sequence of steps in the lean roadmap description.

The CCS uses the matching rules database 611 to store information about the matching rules that the present invention uses to match startups and contractors. The matching rules database contains a plurality of fields including a unique reference key for each record, a name for the matching rule, a description of the matching rule, the business intelligence system algorithm used to match startups and contractors, and a date and time stamp for matching rule.

The CCS uses the work order database 612 to store information about each work order submitted by a team member. The work order database contains a plurality of fields including a unique reference key for each record, the unique reference key for the startup, the unique reference key for the contractors, the contractor's rate, and the number of work units, a time stamp, deliverable, requirement, solution, solution approval and feedback.

The CCS uses the excellence awards database 613 to store information about each excellence award. The excellence awards database contains a plurality of fields including a unique reference key for each recipient of the award (e.g., entrepreneur or team member), the unique reference key for the person who submitted the award (e.g., entrepreneur or team member), the description of the activity that earned the award, and the date and time stamp for the award.

The CCS uses the notification and messaging database 614 to save and archive information about notifications and messages. The notification database also stores links to templates for the different types of notifications. A notification is a message sent to a user to inform that user that an event has occurred, such as the completion of a deliverable. For each notification, the notification database contains a plurality of fields including a unique reference key for each record, the type of event that has caused the notification (e.g., an offer), the unique reference key for the event that has caused the notification (e.g., the unique reference key for a specific order), the type of template to use for the notification, the unique reference key for the user to be notified (e.g., unique reference key for the vendor), the date and time of the event that caused the notification, the date and time that the notification was sent, the title of the notification, the message within the notification, the unique reference key for each user who shall receive a carbon copy of the notification and the unique reference key for each user who shall receive a blind copy of each notification.

The CCS uses the encryption database 615 to store information about the symmetric encryption keys, private encryption keys, and public encryption keys. The encryption database contains a plurality of fields including a unique reference key for each record, the unique reference key for each user and information about the encryption keys. This information does not give the CCS access to the actual encryption keys.

The CCS uses the workflow management database 616 to store information about different workflows, such as the lean startup roadmap. The workflow management system has its own database that is described below.

For each workflow submitted to the CCS, the workflow management database contains a plurality of fields including a unique reference key for each record, a name for the workflow, a description of the workflow, the steps in the workflow and the unique reference key for the type of workflow.

The CCS uses the campaign database 617 to store information about fund raising campaigns. The campaign database contains a plurality of fields including a unique reference key for each record, the name of the campaign, a description for the campaign, the unique reference key for the corresponding startup, links to information that supports the campaign, the terms and conditions for the funds, the timeframe for the campaign, the total amount of money required, the proposed use of the funds and timeframe and benefits, the amount of money pledged so far and the users people who pledged the funds.

The CCS uses the payment processor database 618 to store information about payments between buyers and sellers on the platform. The payment processor system has its own database that is described below. However, each payment that is submitted to the CCS is stored in the payment processor database. For each payment submitted to the CCS, the payment processor database contains a plurality of fields including a unique reference key for each record, the user's payment credentials, the amount of the payment, the payment method, the type of transaction, the date and time that the payment was submitted, whether the payment was accepted or rejected and the date and time that the payment was confirmed or rejected. Payments can be for a number of purposes included payments from users to the system operator for services provided, payments from startups to suppliers and payments from service providers to the system operator.

The CCS uses the messaging database 619 to save and archive messages. The messaging database also stores links to templates for the different types of messages. A message is a communication from one user to another user or a note saved by a user. For each message, the messaging database contains a plurality of fields including a unique reference key for each record, the unique reference key for messaging thread (e.g., text messaging between an entrepreneur and a contractor), the sequence in the thread for the message, and the date and time for the message.

The CCS uses the forums database 620 to store information about forums. The forums database contains a plurality of fields including a unique reference key for each record, the name of the forum, the purpose of the forum, the topic, and the audience who can see the forum and participate.

FIG. 7 illustrates the key components of the Business Intelligence System in a first embodiment of the apparatus and method of the present invention.

The Business Intelligence System 208 is operatively coupled to the CCS. Many companies supply business intelligence systems that can be used by the present invention including Microstrategy and Oracle. The CCS uses the business intelligence system to analyze data stored in the plurality of databases that comprise the data storage system 207. The purpose of the analysis by the business intelligence system is to identify trends, patterns and relationships that may be hidden in the data stored in the data storage system.

The present invention uses a commercial Business Intelligence System 208 that is illustrated in FIG. 7. It includes a plurality of modules including an extract, transform and data load "ETL" module 701, a data warehouse module 702, an analytic tools module 703, a data mining module 704, a reporting tools module 705 and a presentation layer module 706. The main purpose of a business intelligence system is to enable organizations to capture, process and analyze vast amounts of data from a plurality of sources then identify trends, patterns and relationships that can facilitate business decision-making.

The ETL module 701 is the interface between the Business Intelligence System and the CCS. The main purpose of the ETL module is to transfer data from the CCS to the data warehouse. Using ETL tools to operatively couple a system, such as the Business Intelligence System, to the CCS is explained above in the description of FIG. 2.

The data warehouse module 702 is a database built in a commercial storage system substantially the same as the data storage system described in FIG. 6. The data warehouse module contains a copy of a pre-determined subset of the total data that is available in the data storage system 207. The system administrator user specifies the data in the data storage system that the system administrator wants to use for business analysis. The installation engineer configures the ETL module to extract that pre-determined data from the source database in the data storage system, then configures the ETL module to transform that data into a format that is compatible with the data warehouse, then configures the ETL module to load the transformed data into the pre-determined database locations in the data warehouse module. The installation engineer also configures the ETL module to repeat this extract, transform and data load procedure periodically. Many vendors offer commercial data warehousing solutions including Hyperion, Microstrategy and Oracle.

The analytic tools module 703 includes standard on-line analytical processing ("OLAP") functionality. OLAP software enables users to create various views and representations of data in the data warehouse. OLAP functionality enables the system administrator user to access, analyze and model business issues and share the information that is in the data warehouse. Many vendors offer commercial data warehousing and OLAP solutions including Hyperion, Microstrategy and Oracle. The OLAP council creates OLAP standards.

The data mining tools module 704 enables the system administrator user to discover trends, patterns and relationships in the data stored in the data warehouse module. Data mining software is designed to analyze large volumes of data using sophisticated data search techniques then apply statistical methods to discover trends, patterns and relationships in the data. Many vendors offer commercial data mining software including Baan Software, Oracle, SAP, Sybase and Tableau Software. The Data Mining Group is an independent, vendor led consortium that develops data mining standards.

The reporting tools module 705 enables the system administrator user to create reports that display the data stored in the data warehouse as well as information that illustrates the trends, patterns and relationships in the data stored in the data warehouse module. Many vendors offer commercial reporting software including Business Objects, Cognos, Crystal Reports and Microstrategy.

The presentation layer module 706 includes graphics and multimedia interfaces that enable information and reports to be displayed in a user-friendly manner. The reporting tools described above all include a presentation layer module.

Figure 8:
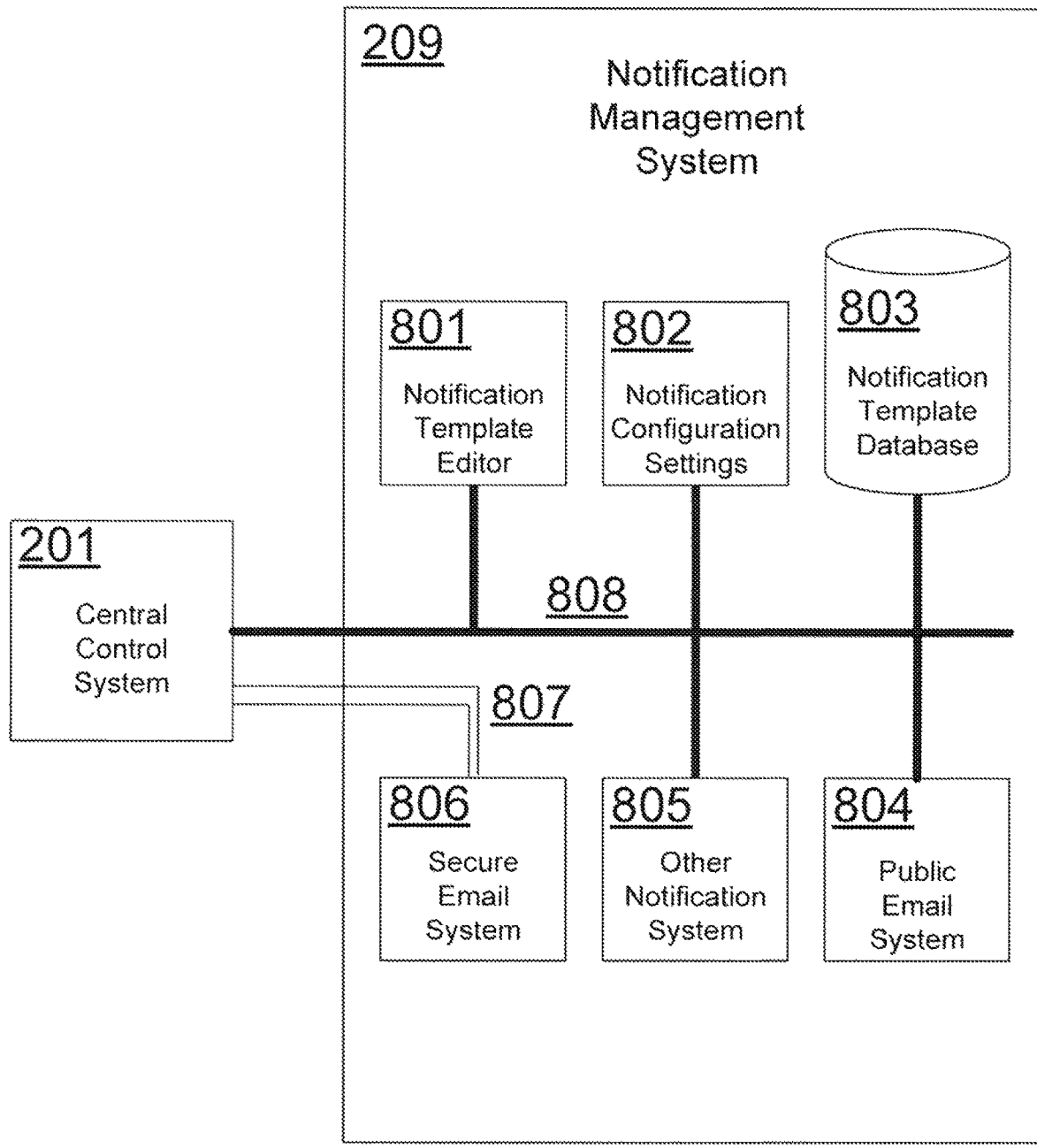
FIG. 8 illustrates a first embodiment of the notification management system ("NMS") of the present invention.

FIG. 8 illustrates the key components of the notification management system in a first embodiment of the apparatus and method of the present invention.

The notification management system 209 is operatively coupled to the CCS. The purpose of the notification management system is to send a notification whenever an event occurs that requires the attention of a user. The CCS sends a notification message via the notification management system to inform the recipient of the notification that a key event has occurred such as a payment has been made. The system administrator user configures the notification management system to monitor a plurality of other events then alert the pre-determined user when the specific event occurs.

FIG. 8 illustrates the Notification Management System used by the present invention. This Notification Management System includes a plurality of modules including a notification template editor 801, a notification configuration settings module 802, a notification template database 803, at least one public email system 804, at least one other notification system 805, a secure email system 806, a virtual private network (VPN) 807 and a wide area network 808.

The notification template editor 801 is a standard commercial word processor that the system administrator user can use to draft notification templates. The system administrator user then saves those templates into the notification template database 803. The system administrator inserts bookmarks into the notification template where information must be added to convert the template into an actual notification message. For example, the system administrator inserts a bookmark for the notification address (such as an email address) of the pre-determined user to whom the notification shall be sent.

The system administrator user uses the notification configuration settings module 802 to configure and enable the notifications. For example, in one embodiment of the present invention the system administrator user will configure a notification to be sent whenever a key lean roadmap deliverable is completed. The configuration information will include a plurality of information including the event (e.g., a completed deliverable), the contact information for the user to be notified, the title of the notification, information about the deliverable, and related meta data.

The notification template database 803 is used to store notification templates. For each notification template, the notification template database contains a plurality of fields including a unique reference key for each record, the unique reference key for the type of event for which the notification template shall be used, the title of the event, the standard message in the notification, the unique reference key for each user who shall receive the notification, the unique reference key for each user who shall receive a carbon copy of the notification and the unique reference key for each user who shall receive a blind copy of the notification. When a predetermined event occurs, the CCS will identify the predetermined users to whom the notification shall be addressed, the predetermined users who shall receive a copy of the notification and the predetermined users who shall receive a blind copy of the notification. The CCS passes this information and a plurality of other information, such as the predetermined template to use for the specific event, to the notification management system that extracts information from the notification and messaging database 614 to fill in the blanks in the predetermined notification template.

The public email system 804 enables users to receive notifications from the CCS by email. It also enables users to send emails to the CCS. A plurality of public email systems are available to users including yahoo mail, hotmail, and gmail. When a user registers with the CCS, that user must input an email address that the CCS will use to send notifications.

To one skilled in the art, it will be evident that the CCS can use other notification systems 805 to notify users that an event has occurred. Other possible notification systems include instant messaging, text messages, telephone service, and wireless services. When the user registers with the CCS, the user can input their contact information for their alternative notification systems.

The secure email system 806 enables users to receive secure notifications from the CCS by email. It also enables users to send secure emails to the CCS. A plurality of vendors provide secure email services, such as Zix mail. When a user registers with the CCS, the CCS will give that user a secure email address. The CCS is connected to the secure email system by a virtual private network (VPN) 807. Commercial telephone companies such as Verizon provide virtual private networks. These VPN circuits provide more security than a regular telephone circuit. The other components of the notification management system are interconnected by a combination of wide and local area networks 808. Such networks are described above in the discussion of FIG. 3.

When an event occurs that requires a notification that does not include sensitive information, the CCS will send the notification to the user's secure email address and also to the user's public email address. When an event occurs that requires a notification that does include sensitive information then the CCS will send the notification to the user's secure email address. The CCS will also send a different notification to the user's public email address informing that user that a secure notification message has been sent to that user's secure email address. The user will then log in to the CCS to access the secure notification.

Figure 9:
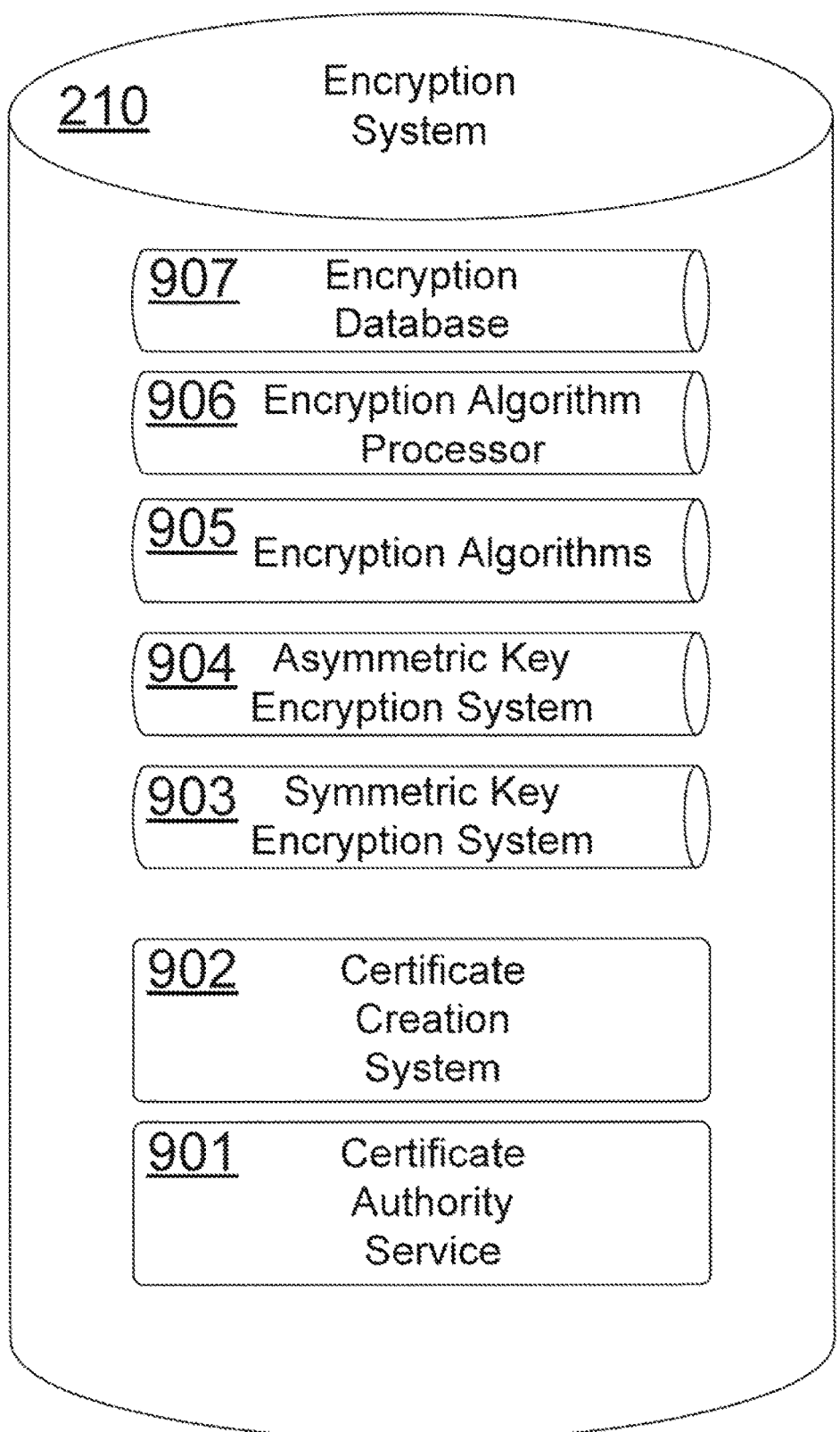
FIG. 9 illustrates a first embodiment of the encryption system of the present invention.

FIG. 9 illustrates the key components of the Encryption System which is operatively coupled to the Central Control System. The Encryption System used by the present invention is comprised of a plurality of modules including a certificate authority service 901, a certificate creation system 902, a symmetric encryption key encryption system 903, an asymmetric key encryption system 904, encryption algorithms 905, an encryption algorithm processor 906, and an encryption database 907.

The certificate authority service 901 is independent of both users who want to communicate. However, it is a source that is trusted by both users and confirms that they both are who they say they are. In addition, the certificate authority service provides the public encryption keys to each user. In summary, the certificate authority service authenticates the users and the fact that the authorization has not been altered.

Authentication is used with encryption to create a secure communication environment. Standard authentication systems include user name and password, pass cards that use a magnetic strip similar to that on a credit card, smart cards that have an embedded chip, and digital signatures based on the Digital Signature Standard (DSS) that uses the Digital Signature Algorithm (DSA). More modern forms of encryption use biometrics for authentication. Biometrics use biological information to verify a user's identity. Biometric authentication methods include fingerprint scans, retina scans, face scans and voice identification. Biometric authentication eliminates many of the risks associated with not knowing who is using an authenticated input or output device. Biometric authentication therefore provides an additional level of security over device level authentication for secure personal communications.

The certificate creation system 902 generates a certificate for each user in the form of a piece of code, or a large number, that says that the user is trusted by the certificate authority. When the entrepreneur, for example, sends an order to a supplier, that entrepreneur also sends his public encryption key and certificate to the supplier, to validate three things: 1) that the certificate comes from a trusted party; 2) that the certificate is currently valid; and 3) that the certificate has a relationship with the present invention.

The symmetric key encryption system 903 generates a secret code for each user. The encryption system uses this secret code, or encryption key, to encrypt information. Modern encryption systems use the advanced encryption standard (AES), which uses 128-, 192- or 256-bit encryption keys. These create more than $2^{128}$ possible key combinations for the encryption key. For a hacker trying to guess the encryption key, this is like trying to find one specific grain of sand in the Sahara Desert. It would take a hacker so long to guess the correct key combination that this encryption standard is considered to be secure for the foreseeable future. For symmetric key encryption, the same key is used to encrypt and decrypt a message. The use of symmetric encryption keys and asymmetric encryption keys in the present invention is described below.

The asymmetric key encryption system 904 generates two secret codes for each user, a public encryption key and a private encryption key. When a first user wants to send an encrypted message to a second user but does not want to risk sending the encryption key then the asymmetric key encryption system is used. The use of symmetric encryption keys and asymmetric encryption keys in the present invention is described below. For example, in the present invention, when the entrepreneur wants to send a symmetric encryption key to a supplier, that entrepreneur uses the public encryption key of the selected supplier to encrypt the symmetric encryption key. The supplier then uses his or her private encryption key to decrypt the symmetric encryption key. This is possible because an encryption algorithm is used where the algorithm, or function "F" is such that, F(clear symmetric encryption key, buyer's public encryption key)=encrypted symmetric encryption key and F(encrypted symmetric encryption key, buyer's private encryption key)=clear symmetric encryption key. Therefore, by using the same algorithm ("F") a user's private encryption key can be used to decrypt the symmetric encryption key that was encrypted by the same user's public encryption key (U.S. Pat. No. 8,374,354 B2). One advantage of the present invention is that the encryption and decryption are performed at the user interface preferably initiated by biometrics. For confidential information, the present invention only has access to the encrypted version of the symmetric encryption key and cannot decrypt the symmetric encryption key. The symmetric encryption key is used to encrypt and decrypt the information. In other systems, encryption is used to secure the transmission of digital media from the user to the system. This enables confidential information to be decrypted by the system operator which creates the risk of hacking supported by rogue employees of the system operator.

A number of encryption algorithms 905 have been created that can be used by the present invention. Symmetric key encryption algorithms include The Data Encryption Standard (DES) was adopted as a U.S. government standard in 1977 and as an ANSI standard in 1981. Triple-DES is a way to make the DES dramatically more secure by using the DES encryption algorithm three times with three different keys, for a total key length of 168 bits. Also called "3DES," this algorithm has been widely used by financial institutions and by the Secure Shell program (ssh). Blowfish is a fast, compact, and simple block encryption algorithm invented by Bruce Schneier. The algorithm allows a variable-length key, up to 448 bits, and is optimized for execution on 32- or 64-bit processors. The algorithm is unpatented and has been placed in the public domain. Blowfish is used in the Secure Shell and other programs. Asymmetric key encryption algorithms include the Rivest Shamir Adleman (RSA) public encryption key algorithm that can be used for encrypting and signing data and Elliptic Curve Cryptography (ECC) which provides similar functionality to RSA for smaller devices like cell phones. It requires less computing power than RSA. ECC encryption systems are based on the idea of using points on a curve to define the public/private encryption key pair. The present invention can use these and other standard encryption algorithms.

The encryption algorithm processor 906 is the code that is used to encrypt and decrypt information. The present invention includes its own code for these purposes and also can use other code considered to comply with industry standards. By way of example, sample code that was published by syntx.io includes the following to encrypt a message using AES as the algorithm public static final String encrypt(final String message, final Key key, final IvParameterSpec iv) throws IllegalBlockSizeException,
BadPaddingException, NoSuchAlgorithmException,
NoSuchPaddingException, InvalidKeyException,
UnsupportedEncodingException,
InvalidAlgorithmParameterException {
  Cipher cipher=
Cipher.getInstance("AES/CBC/PKCS5Padding");
  cipher.init(Cipher.ENCRYPT_MODE,key,iv);
  byte[ ] stringBytes=message.getBytes( );
  byte[ ] raw=cipher.doFinal(stringBytes);
  return Base64.encodeBase64String(raw);
}

The same example from syntx.io published the following code to decrypt the message:

public static final String decrypt(final String encrypted, final Key key, final IvParameterSpec iv) throws InvalidKeyException,
NoSuchAlgorithmException, NoSuchPaddingException,
IllegalBlockSizeException, BadPaddingException,
IOException, InvalidAlgorithmParameterException {

```
Cipher      cipher=Cipher.getInstance("AES/CBC/
   PKCS5Padding");
cipher.init(Cipher.DECRYPT_MODE, key,iv);
byte[ ] raw=Base64.decodeBase64(encrypted);
byte[ ] stringBytes=cipher.doFinal(raw);
String clearText=new String(stringBytes, "UTF8");
return clearText;
}
```

It will be evident to one skilled in the art that more robust algorithms are available for use, can be developed, and can be used by the present invention.

The encryption database 907 is substantially the same as the encryption database 615 in FIG. 6. It stores the encryption information required by the other modules described above that comprise the encryption system.

Figure 10:
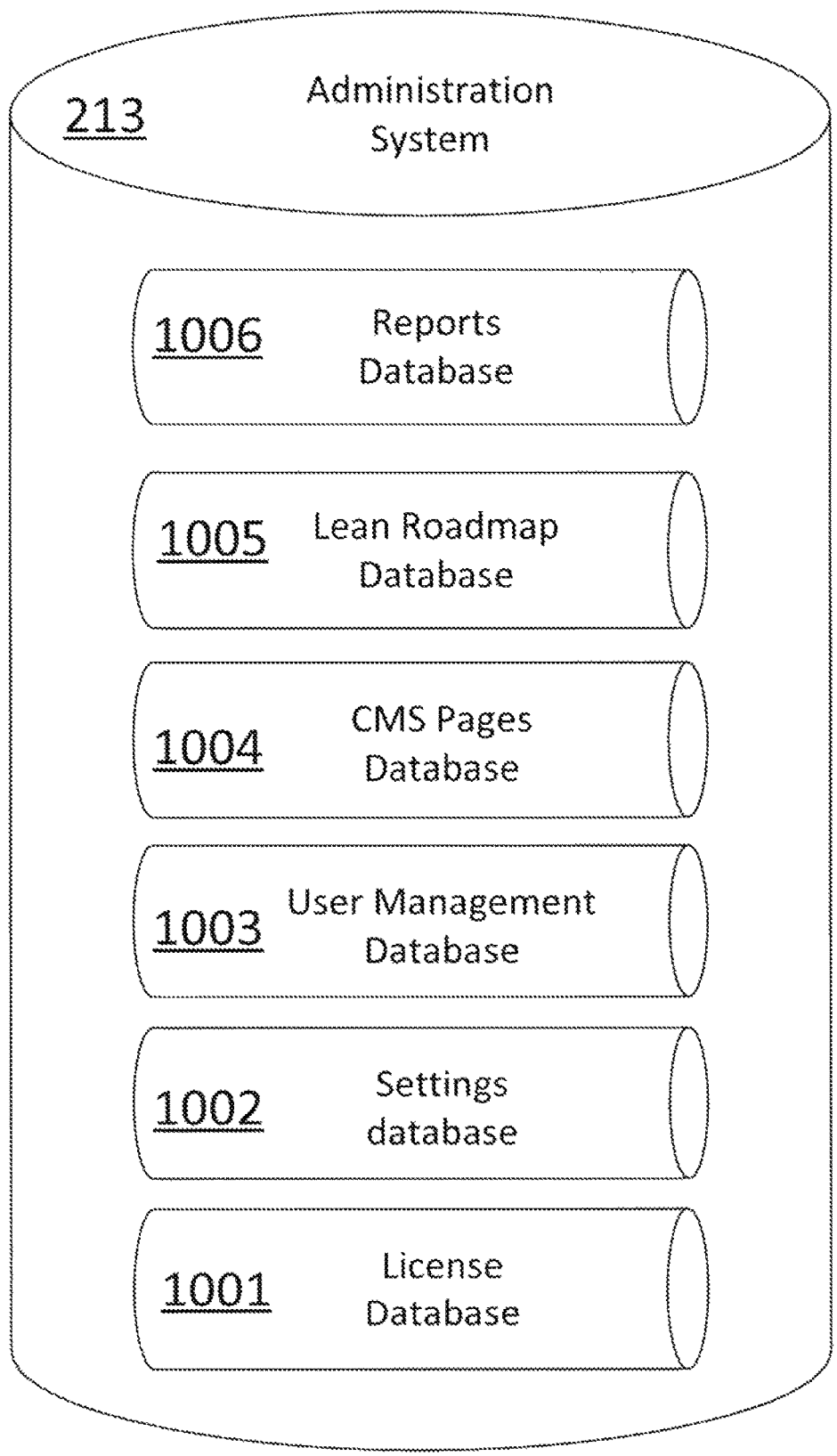
FIG. 10 illustrates a first embodiment of the administration system of the present invention.

FIG. 10 illustrates the key components of the Administration System 213 which is operatively coupled to the Central Control System. The Administration System used by the present invention is comprised of a plurality of modules including a license database 1001, a settings database 1002, a user management database 1003, a CMS pages database 1004, a transactions database 1005, and a reports database 1006.

- The license database 1001 stores information about which users are authorized to use the present invention. The license database contains a plurality of fields including a unique reference key for each record in the license database, the unique reference key of each user, and licensing and payment information for each user.
- The settings database 1002 stores configuration information for the present invention.
- The user management database 1003 stores information about users. This information includes the type of user, contact information, and the user's status such as active or inactive.
- The CMS pages database 1004 stores information about the web site pages and mobile user interface for the present invention. This module enables the system administrator to edit the content on these pages. Example pages include "About Us", "Frequently Asked Questions", "Home", and the "User Agreement".
- The lean roadmap database 1005 stores information about startup deliverables in the present invention. The lean roadmap database is substantially the same as the lean roadmap database 610 in the data storage system 207. The lean roadmap database in the administration system enables the system administrator to manage deliverables and resolve issues.
- The reports database 1006 stores information about reports in the present invention. These reports help the system administrator manage the present invention. Example reports include the amount of the available storage used, peak and average CPU utilization in system servers, and peak and average number of users.

FIG. 11 illustrates an overview of the Workflow Management System ("WMS") in a first embodiment of the apparatus and method of the present invention. The Workflow Management System is used to guide the lean roadmap for startups 214 and is operatively coupled to the CCS. Many commercial WMS options are available that can be used by the present invention. However, the present invention uses a modified version of the WMS taught in co-owned application Ser. No. 10/716,747 (Nov. 18, 2003).

- The WMS enables the system administrator to create a workflow that is the preferred procedure to complete lean startup activities 1101.
- The WMS enables the system administrator to modify the workflow that is the preferred procedure to complete lean startup activities 1102.
- The WMS enables the system administrator to save the workflow that is the preferred procedure to complete lean startup activities 1103.
- The WMS enables the system administrator to activate the workflow that is the preferred procedure to complete lean startup activities 1104. This activation process makes the workflow accessible to users.
- The WMS enables an entrepreneur to start the preferred procedure to complete lean startup activities 1105.
- The WMS enables the entrepreneur to open the selected preferred procedure to complete lean startup activities 1106.
- The WMS guides the entrepreneur through the preferred procedure to complete lean startup activities 1107.
- The WMS saves the information created at each completed step in the process and also saves drafts for the incomplete steps 1108. The user can complete the drafts at a later time.
- The WMS enables the entrepreneur to resume the preferred procedure to complete lean startup activities until the procedure is complete 1109.

Preferred Embodiment of the Present Invention

Figure 12:
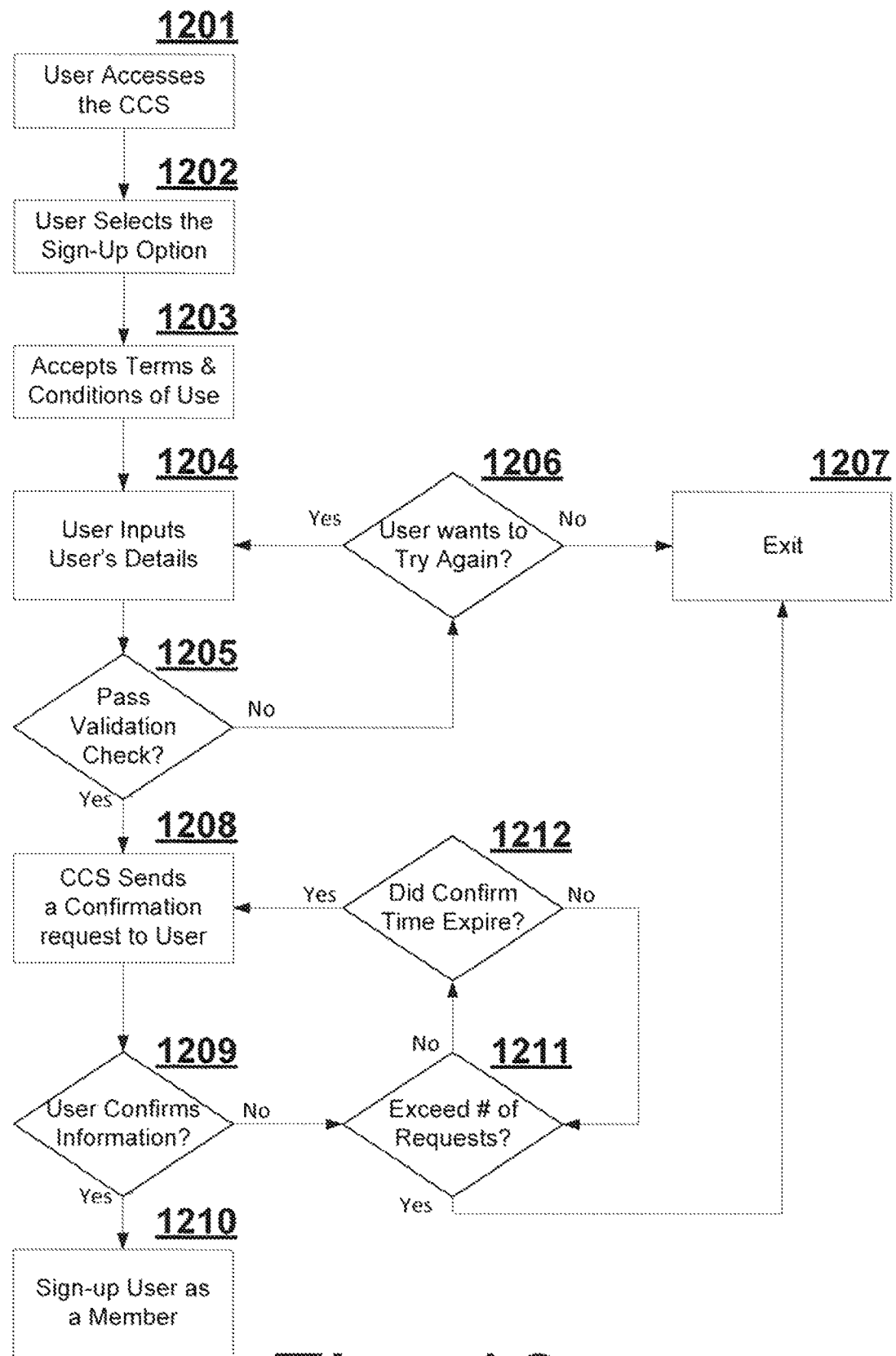
FIG. 12 illustrates a first embodiment of the sign-up procedure for the present invention.

FIG. 12 illustrates the procedure for users to sign-up as members in a first embodiment of the apparatus and method of the present invention.

- The user accesses the CCS 1201 then selects the sign-up option 1202. The user then accepts the predetermined terms and conditions of use 1203. The user then inputs the requested user details 1204. These details include name, contact information, user name, password and the other meta data specified above for the user database illustrated in FIG. 6. When the user accesses the CCS after signing up as a member, that user will have to input the user name and password to log into the CCS. The CCS checks the information entered by the user at step 1204 for completeness. If the information is incomplete 1205, the CCS will offer the user the opportunity to complete the information 1206. If the user chooses to try again to complete the information, the CCS returns to step 1204. If the user chooses not to complete the sign up information, the CCS exits the sign-up procedure 1207.
- If the information entered by the user is complete 1205, the CCS sends a confirmation request to the user 1208. The CCS will send this confirmation request to the email address entered by the user at step 1204. The user can also select to authenticate using a text message rather than an email. The CCS asks the user to confirm receipt of this request 1209. If the user confirms receipt of the confirmation request as requested by the CCS, the CCS will sign-up the user as a member 1210. If the user does not confirm receipt of the confirmation request, the CCS will determine whether the predetermined maximum number of reminder requests have been exceeded 1211. If the CCS has already sent the predetermined maximum number of confirmation requests, then the CCS will exit the sign-up procedure 1207. If the CCS has sent fewer than the predetermined maximum number of confirmation requests, then the CCS will determine whether the predetermined wait time has been exceeded before sending another confirmation request to the user. When the predetermined wait time between reminders has been exceeded 1212, the CCS will send another confirmation request to the user 1208. This will return the CCS to step 1208 in the sign-up procedure.

Figure 13:
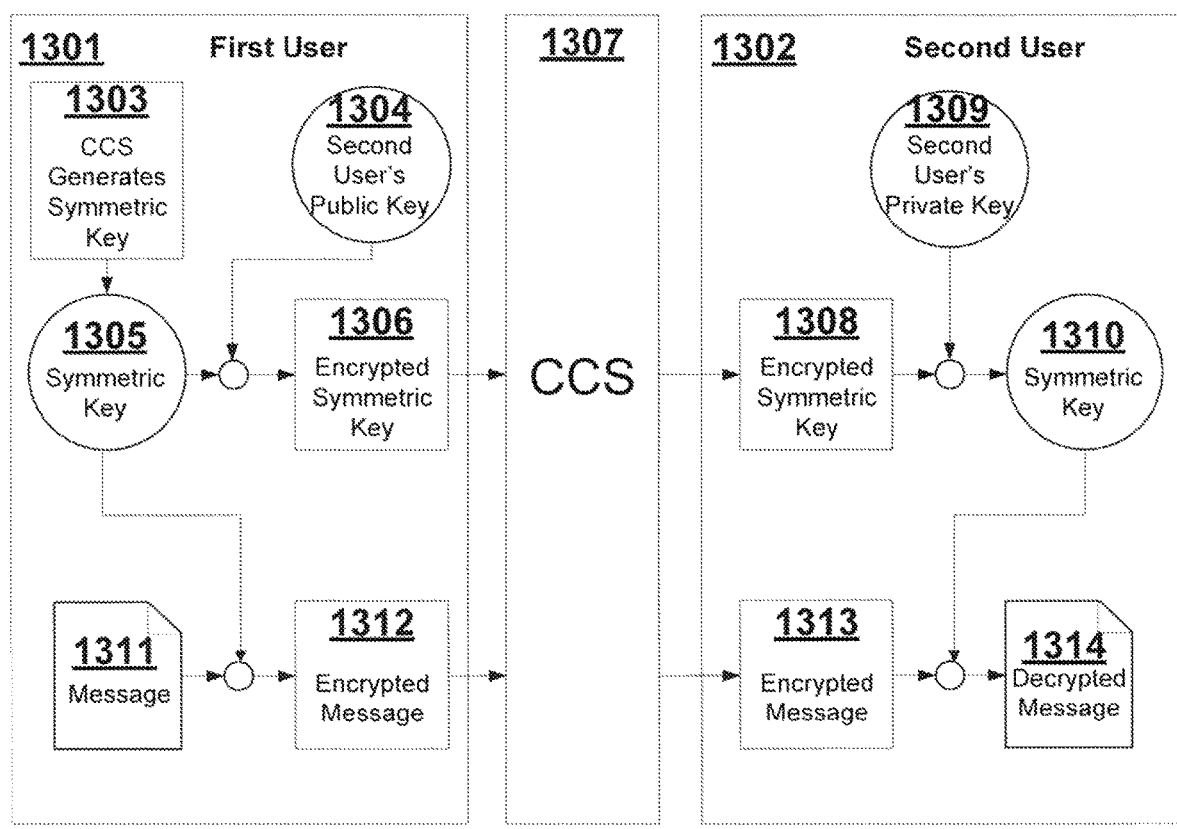
FIG. 13 illustrates a first embodiment of the high level encryption approach for the present invention.

FIG. 13 illustrates the preferred procedure to send a message from a first user 1301 to a second user 1302 through the CCS. When the first user and second user register on the system they download the CCS front end application onto their computer 301. The CCS application is created using standard programming languages such as java, javascript, PHP, HTML, C, C+, and visual basic. The CCS also gives the first user and second user their own symmetric encryption key, private encryption key and public encryption key as described above for the encryption system. The first user and the second user both use the CCS to make their public encryption keys available to other users. When the first user wants to send a message to the second user, the CCS application in the first user's computer 301 generates a new symmetric encryption key 1303 for this transaction. The CCS then uses the second user's public encryption key 1304 to encrypt the symmetric encryption key 1305 and create an encrypted symmetric encryption key 1306. The CCS 1307 then transfers the encrypted symmetric encryption key from the first user to the second user. The CCS front end application on the second user's computer receives the encrypted symmetric encryption key 1308 then uses the second user's private encryption key 1309 to decrypt the encrypted symmetric encryption key and recover the symmetric encryption key 1310 that was generated by the CCS application on the first user's computer for this transaction.

The CCS application on the first user's computer also uses the same symmetric encryption key 1305 to encrypt the target message 1311 and form an encrypted message 1312. The CCS 1307 then transfers the encrypted message from the first user to the second user. The CCS's front end application on the second user's computer receives the encrypted message 1313 then uses the second user's symmetric encryption key 1310 to decrypt the encrypted message and recover the original message 1314 that was sent by the CCS application on the first user's computer. The symmetric encryption key and message cannot be accessed by employees or partners of the CCS platform which minimizes the risk of unauthorized decryption.

Asymmetric encryption is slower than symmetric encryption. The CCS application therefore uses the public encryption key and private encryption key to encrypt and decrypt the symmetric encryption key because the symmetric encryption key is typically much smaller than the user's message. This is a secure method for the CCS to transfer the symmetric encryption key from the first user to the second user. This solution also enables the CCS application to use the faster symmetric key encryption to encrypt and decrypt the target message that is typically much larger than the symmetric encryption key.

Figure 14:
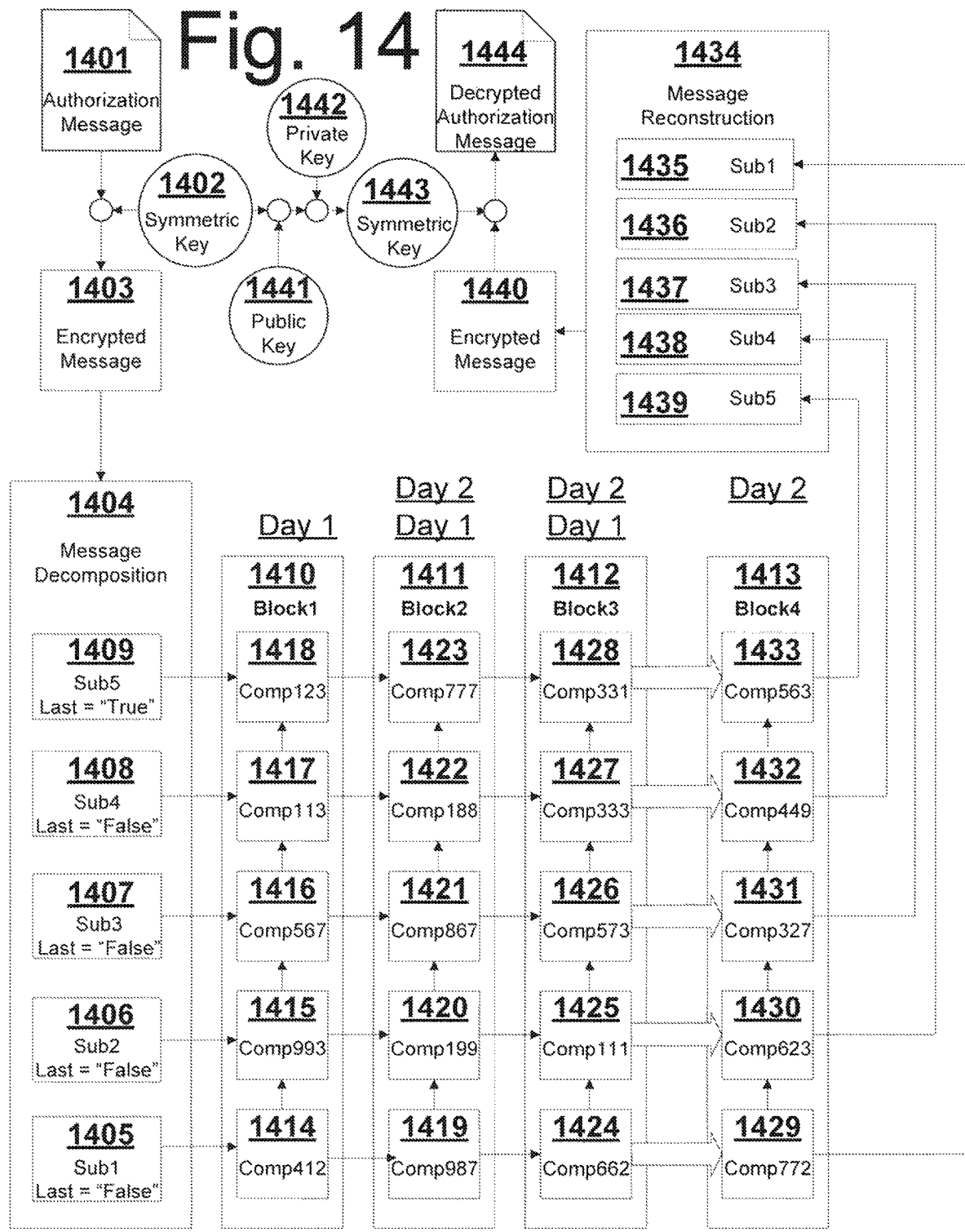
FIG. 14 illustrates a first embodiment of the high level authentication approach for the present invention.

FIG. 14 illustrates the preferred procedure to input and output a secure authorization 1401, such as a prescription for medical products, an authentication certificate for digital media or a reference file for biometric authentication. The CCS application on a first user's computer generates a unique symmetric encryption key 1402 to encrypt each authorization message 1403. The CCS front end application on the user's device generates a different symmetric encryption key for each message. The CCS application on the first user's computer then decomposes the authorization message into a number of subcomponents 1404. A number of tools are available to split a file into subcomponents, such as WinRar and HJSplit. For example, WinRar allows the user to specify the size of each subcomponent. The example in FIG. 14, decomposes the message 1404 into 5 subcomponents Sub1 1405, Sub2 1406, Sub3 1407, Sub4 1408, and Sub5 1409 in that order. It also sets the "last subcomponent flag" to "False" for Sub1 1405, Sub2 1406, Sub3 1407, and Sub4 1408 but sets the "last subcomponent flag" to "True" for Sub5 1409 because Sub5 1409 is the last subcomponent of message 1404. It also sets the counter=1 for Sub1 1405, counter=2 for Sub2 1406, counter=3 for Sub3 1407, counter=4 for Sub4 1408 and counter=5 for Sub5 1409. The CCS application on the first user's computer randomly selects three computers, Comp412 1414, Comp987 1419, and Comp682 1424, from a predetermined list of member computers. Each organization that wants to use this dynamic process to decompose encrypted messages can propose a computer to participate in the consortium of member computers. After the system administrator vets the organization and vets the proposed computer then the vetted computer is added to the list of member computers. The CCS application on the first user's computer, writes the first subcomponent 1405 of the decomposed encrypted authorization message and the counter value (e.g., 1) and the "last subcomponent flag" (e.g., "False") from subcomponent1 (Sub1) to computer 412 (Comp412) 1414. It also writes the same subcomponent1 (Sub1), counter value and "last subcomponent flag" to computer 987 (Comp987) 1419 and the same subcomponent1 (Sub1), counter value and "last subcomponent flag" to computer 662 (Comp662) 1424.

Computer 412 (Comp412) 1414 then randomly selects another computer from the predetermined list of member computers, namely computer 993 (Comp993) 1415. Computer 412 (Comp412) 1414 then instructs the CCS application on the first user's computer to copy subcomponent2 (Sub2), the counter value (e.g., 2) and the "last subcomponent flag" (e.g., "False") 1406 to computer 993 (Comp993) 1415. When Computer 412 (Comp412) 1414 makes this request, it increments its own counter by 1 (e.g., 1+2=2) to know which subcomponent (e.g., Sub2) to request from block 1404 to be sent to computer 993 (Comp993) 1415. Similarly, Computer 987 (Comp987) 1419 randomly selects another computer from the predetermined list of member computers, namely computer 199 (Comp199) 1420. Computer 987 (Comp987) 1419 then instructs the CCS application on the first user's computer to copy subcomponent2 (Sub2), the counter value (e.g., 2) and the "last subcomponent flag" (e.g., "False") 1406 to computer 199 (Comp199) 1420. Further, Computer 662 (Comp662) 1424 randomly selects another computer from the predetermined list of member computers, namely computer 111 (Comp111) 1425. Computer 662 (Comp662) 1424 then instructs the CCS application on the first user's computer to copy subcomponent2 (Sub2), the counter value (e.g., 2) and the "last subcomponent flag" (e.g., "False") 1406 to computer 111 (Comp111) 1425.

Computer 993 (Comp993) 1415 then randomly selects another computer from the predetermined list of member computers, namely computer 567 (Comp567) 1416. Computer 993 (Comp993) 1415 then instructs the CCS application on the first user's computer to copy subcomponent3 (Sub3), the counter value (e.g., 3) and the "last subcomponent flag" (e.g., "False") 1407 to computer 567 (Comp567) 1416. When Computer 993 (Comp993) 1415 makes this request, it uses its own counter+1 (e.g., 2+1=3) to determine which subcomponent (e.g., Sub3) to request from block 1404 to be sent to computer 567 (Comp567) 1416. Similarly, Computer 199 (Comp199) 1420 randomly selects another computer from the predetermined list of member computers, namely computer 867 (Comp867) 1421. Computer 199 (Comp199) 1420 then instructs the CCS application on the first user's computer to copy subcomponent3 (Sub3), the counter value (e.g., 3) and the "last subcomponent flag" (e.g., "False") 1407 to computer 867 (Comp867) 1421. Further, Computer 111 (Comp111) 1425 randomly selects another computer from the predetermined list of member computers, namely computer 573 (Comp573) 1426. Computer 111 (Comp111) 1425 then instructs the CCS application on the first user's computer to copy subcomponent3 (Sub3), the counter value (e.g., 3) and the "last subcomponent flag" (e.g., "False") 1407 to computer 573 (Comp573) 1426.

Computer 567 (Comp567) 1416 then randomly selects another computer from the predetermined list of member computers, namely computer 113 (Comp113) 1417. Computer 567 (Comp567) 1416 then instructs the CCS application on the first user's computer to copy subcomponent4 (Sub4), the counter value (e.g., 4) and the "last subcomponent flag" (e.g., "False") 1408 to computer 113 (Comp113) 1417. When Computer 567 (Comp567) 1416 makes this request, it uses its own counter+1 (e.g., 3+1=4) to determine which subcomponent (e.g., Sub4) to request from block 1404 to be sent to computer 113 (Comp113) 1417. Similarly, Computer 867 (Comp867) 1421 randomly selects another computer from the predetermined list of member computers, namely computer 188 (Comp188) 1422. Computer 867 (Comp867) 1421 then instructs the CCS application on the first user's computer to copy subcomponent4 (Sub4), the counter value (e.g., 4) and the "last subcomponent flag" (e.g., "False") 1408 to computer 188 (Comp188) 1422. Further, Computer 573 (Comp573) 1426 randomly selects another computer from the predetermined list of member computers, namely computer 333 (Comp333) 1427. Computer 573 (Comp573) 1426 then instructs the CCS application on the first user's computer to copy subcomponent4 (Sub4), the counter value (e.g., 4) and the "last subcomponent flag" (e.g., "False") 1408 to computer 333 (Comp333) 1427.

Computer 113 (Comp113) 1417 then randomly selects another computer from the predetermined list of member computers, namely computer 123 (Comp123) 1418. Computer 113 (Comp113) 1417 then instructs the CCS application on the first user's computer to copy subcomponent5 (Sub5), the counter value (e.g., 5) and the "last subcomponent flag" (e.g., "True") 1409 to computer 123 (Comp123) 1418. When Computer 113 (Comp113) 1417 makes this request, it uses its own counter+1 (e.g., 4+1=5) to determine which subcomponent (e.g., Sub5) to request from block 1404 to be sent to computer 123 (Comp123) 1418. Similarly, Computer 188 (Comp188) 1422 randomly selects another computer from the predetermined list of member computers, namely computer 777 (Comp777) 1423. Computer 188 (Comp188) 1422 then instructs the CCS application on the first user's computer to copy subcomponent5 (Sub5), the counter value (e.g., 5) and the "last subcomponent flag" (e.g., "True") 1409 to computer 777 (Comp777) 1423. Further, Computer 333 (Comp333) 1427 randomly selects another computer from the predetermined list of member computers, namely computer 331 (Comp331) 1428. Computer 333 (Comp333) 1427 then instructs the CCS application on the first user's computer to copy subcomponent5 (Sub5), the counter value (e.g., 5) and the "last subcomponent flag" (e.g., "True") 1409 to computer 331 (Comp331) 1428.

Block1 1410 is a copy of the encrypted authorization message distributed across five random computers. Block2 1411 is a second copy of the encrypted authorization message distributed across five different random computers. Block3 1412 is a third copy of the encrypted authorization message distributed across five more random computers. None of the computers in each block know all of the other computers in the block. For example, Comp993 1415 only knows that Comp567 1416 is the next computer in the chain after itself for Block1. It does not know that Comp113 1417 is the next computer after Comp567 1416. This makes the solution more secure because a hacker would have to break into many independent computers to recover the encrypted information then that hacker would need to figure out how to reconstruct the messages and also figure out how to decrypt the information. This additional security is appropriate for the storage of referenceable personal identifiable information such as customer biometrics and prescription information. After a pre-determined period of time, one day say, the CCS application on the first user's computer randomly selects another computer 1429 from a predetermined list of member computers. The CCS application on the first user's computer, writes the first subcomponent of the decomposed encrypted authorization message from subcomponent1 (Sub1), the counter value (e.g., 1) and the "last subcomponent flag" (e.g., "False") 1405 to computer 772 (Comp772) 1429. Similar to above, computer 772 (Comp772) 1429 randomly selects another computer from the predetermined list of member computers, namely computer 623 (Comp623) 1430 then instructs the CCS application on the first user's computer to copy subcomponent2 (Sub2), the counter value (e.g., 2) and the "last subcomponent flag" (e.g., "False") 1406 to computer 623 (Comp623) 1430. Similar to above, computer 623 (Comp623) 1431 randomly selects another computer from the predetermined list of member computers, namely computer 327 (Comp327) 1431 then instructs the CCS application on the first user's computer to copy subcomponent3 (Sub3), the counter value (e.g., 3) and the "last subcomponent flag" (e.g., "False") 1407 to computer 327 (Comp327) 1431. Similar to above, computer 327 (Comp327) 1431 randomly selects another computer from the predetermined list of member computers, namely computer 449 (Comp449) 1432 then instructs the CCS application on the first user's computer to copy subcomponent4 (Sub4), the counter value (e.g., 4) and the "last subcomponent flag" (e.g., "False") 1408 to computer 449 (Comp449) 1432. Similar to above, computer 449 (Comp449) 1432 randomly selects another computer from the predetermined list of member computers, namely computer 563 (Comp563) 1433 then instructs the CCS application on the first user's computer to copy subcomponent5 (Sub5), the counter value (e.g., 5) and the "last subcomponent flag" (e.g., "True") 1409 to computer 563 (Comp563) 1433. This flag indicates that subcomponent5 is the final subcomponent that comprises the authorization message 1401.

Block4 1413 is a fourth copy of the encrypted authorization message distributed across five random computers. The CCS instructs the CCS application on the first user's computer to delete Bock 1 1410 by discarding subcomponent1 (Sub1) from computer 412 (Comp412) 1414. Computer 412 (Comp412) 1414 then instructs Computer 993 (Comp993) 1415 to discard subcomponent2 (Sub2) from computer 993 (Comp993) 1415. Computer 993 (Comp993) 1415 then instructs Computer 567 (Comp567) 1416 to discard subcomponent3 (Sub3) from computer 567 (Comp567) 1416. Computer 567 (Comp567) 1416 then instructs Computer 113 (Comp113) 1417 to discard subcomponent4 (Sub4) from computer 113 (Comp113) 1417. Computer 113 (Comp113) 1417 then instructs Computer 123 (Comp123)

1418 to discard subcomponent5 (Sub5) from computer 123 (Comp123) 1418. In the example illustrated in FIG. 14, on Day 1 Block1, Block2 and Block3 form three copies of the decomposed messages. On Day 2, Block4 is created and Block1 is deleted. This process of creating a new block and deleting an old block continues until the message is no longer required. This causes the three copies of the decomposed message to keep moving dynamically throughout the network of member computers making the information more difficult to find for a hacker.

In order for the CCS application on the second user's computer (such as a pharmacist reviewing a prescription, an intellectual property user reviewing an authentication certificate or a user authenticating a biometric parameter) to reconstruct the authorization message, the CCS application on the first user's computer (such as the prescribing doctor or intellectual property owner) sends a unique authorization identifier ("authorization ID") to the second user (pharmacist or intellectual property user). Alternatively, the first user (e.g., the doctor or intellectual property owner) can give the authorization identifier to the patient or intellectual property reseller who can forward it to the pharmacist or intellectual property user. The pharmacist or intellectual property user uses the unique authorization identifier to request the authorization (e.g., request the prescription or authentication certificate). The CCS verifies the unique authorization identifier then copies subcomponent1 (Sub1) from computer 772 (Comp772) 1429 to the second user's computer 1435. Similarly, computer 772 (Comp772) 1429 knows that computer 623 (Comp623) 1430 is the next computer in Block4 and instructs computer 623 (Comp623) 1430 to write subcomponent2 (Sub2) to the second user's computer 1436. Similarly, computer 623 (Comp623) 1430 knows that computer 327 (Comp327) 1431 is the next computer in Block4 and instructs computer 327 (Comp327) 1431 to write subcomponent3 (Sub3) to the second user's computer 1437. Similarly, computer 327 (Comp327) 1431 knows that computer 449 (Comp449) 1432 is the next computer in Block4 and instructs computer 449 (Comp449) 1432 to write subcomponent4 (Sub4) to the second user's computer 1438. Similarly, computer 449 (Comp449) 1432 knows that computer 563 (Comp563) 1433 is the next computer in Block4 and instructs computer 563 (Comp563) 1433 to write subcomponent5 (Sub5) to the second user's computer 1439. Computer 563 (Comp563) 1433 knows that it is the final computer in the chain because its "last subcomponent flag" is set to "True" indicating that subcomponent5 is the final subcomponent that comprises the authorization message 1401. The second user can alternatively reconstruct the message from the computers in Block3 or Block2 in addition to Block4.

The CCS application on the second user's computer then uses the same decomposition application, such as WinRar or HJSplit, to reconstruct the encrypted authorization message 1440. The CCS application on the first user's computer uses the second user's public encryption key 1441 to encrypt the symmetric encryption key 1402. The first user then uses the CCS to send the encrypted symmetric encryption key to the second user. The CCS application on the second user's computer then uses her private encryption key 1442 to decrypt the symmetric encryption key 1443. The CCS application on the second user's computer then uses the symmetric encryption key 1443 to decrypt the authorization message 1444.

The example in FIG. 14, illustrates three copies of the authorization message one in each of Block1 1410, Block2 1411 and Block3 1412. In the present invention, the number of replicated messages can be reduced to 1 or 2 or increased to more than 3 to provide more or less redundancy in order to match the specific needs of each business requirement.

FIG. 15 illustrates a high level summary of the preferred embodiment of the present invention. The system administrator ("System Admin"), entrepreneur and independent contractor each create a profile 1501. The system administrator creates a fund and inputs the terms and conditions for the fund 1502. Those terms and conditions specify a number of conditions including the governance rules of the fund, the performance expectations of the startup, the benefits for the stakeholders in the fund and the operating fees for the fund. One of the conditions is that the fund provides a number of work units to each accepted startup that the startup can use to attract assistance from independent contractors. The system administrator also creates and updates the lean roadmap which is the preferred procedure to start a startup 1503. This preferred procedure is comprised of the minimal number of activities required to validate the business model, build the minimal viable product then gain the first customers. The system operator has worked with a number of startup experts to determine the preferred procedure (e.g., sequence of lean activities) to start a startup. The goal of this preferred procedure is to minimize startup costs and accelerate the timeline from idea to customer acquisition. The system administrator creates and updates the match making rules 1504. The business intelligence system uses these rules to compare the goals and needs of startups with the skills and interests of independent contractors. The entrepreneurs and independent contractors enter this information into their profile. In fact, an individual user can create an entrepreneur profile and an independent contractor profile 1505. The business intelligence system uses analysis techniques, such as regression analysis, to identify trends, patterns and relationships. In this case, the business intelligence system identifies relationships between the needs of startups and the interests of independent contractors to recommend opportunities for collaboration. The success of these collaborations is reflected in the excellence awards that entrepreneurs and independent contractors provide to each other. The business intelligence system uses this information as feedback to update the match making rules. The entrepreneur creates a team and gives team members permissions to access the startup's information. The entrepreneur completes the startup application and submits that application for evaluation 1506. The system administrator reviews and approves the startup's application 1507. Entrepreneurs can search for independent contractors to seek assistance and independent contractors can seek startups that they would like to help 1508. Entrepreneurs and independent contractors then communicate about how they can work together then make a commitment 1509. Entrepreneurs then specify their requirements, such as a system design, development work, a sales goal, a marketing plan, business development, etc. Independent contractors propose a solution to each requirement and an estimated number of work units to provide the solution 1510. Each approved startup receives a number of work units from the fund. The entrepreneur reviews and accepts the estimate from the independent contractor 1511. The independent contractor then provides the solution that the entrepreneur reviews and then accepts when it meets expectations 1512. While completing these deliverables, the startup is executing its roadmap with the help of the independent contractor 1513. After the entrepreneur accepts a deliverable that has been completed, the independent contractor submits a work order that specifies the completed deliverable and corresponding work units which the entrepreneur reviews and approves 1514. The CCS forwards the approved work order to the fund. In return, the CCS makes a matching number of bonus work units available to the independent contractor which the independent contractor can donate to any startup 1515. In response to submitting an approved work order, the fund also provides an opportunity for the independent contractor to participate in the fund, including; an option to acquire a specific class of shares in the fund, an actual class of shares in the fund, cash, cash equivalents, an asset, barter, debt and convertible debt 1516. Depending on the type of participation afforded the independent contractor, the fund facilitates the exchange of like kind participation between independent contractors 1517. The independent contractor can search for startups that have merit then offer bonus work units to a startup 1518. If the startup accepts the offer then that startup can use the bonus work units to acquire work order help from any independent contractor 1519. Entrepreneurs can submit an excellence award for independent contractors in the form of a star rating with a description of the excellent work. Similarly, independent contractors can submit an excellence award for entrepreneurs in the form of a star rating with a description 1520. Entrepreneurs can run a campaign to raise funds from independent contractors who are also accredited investors 1521. Suppliers can add their offerings to the shopping cart 1522. Examples of offerings include web site hosting services, laptops for employees and productivity software. Entrepreneurs can use their funds to purchase goods and services from suppliers via the shopping cart 1523. The system operator will negotiate substantial discounts for the startup for the goods and services that are available in the shopping cart. The system administrator's responsibilities also include maintaining the app and web site, such as backing up the database and resolving trouble tickets 1524. Users can also create and moderate forums 1525. A forum will have a topic, such as a startup or specific roadmap deliverable. These forums will therefore also serve as a knowledge base for the specified topic 1526. The present invention will also help startups pool their negotiating power to obtain improved terms and conditions from suppliers, as well as leverage each other's assets to minimize costs and time to market.

The present invention also enables users to input, edit and display information about events, including conferences, demo days, meet ups, and webinars. The CCS is the means to manage this information that is stored in the CCS database 601. The CCS is also the means to manage information about campaigns that is stored in the Campaigns Database 617. Entrepreneurs can use campaigns to raise money but can also use campaigns to prove interest in their startup by convincing independent contractors to commit their valuable time in return for equity in one of the present invention's funds. These types of campaigns enable the operator of the present invention to leverage the wisdom-of-the-crowd when determining which startups to fund. For example, if an entrepreneur can convince a large number of respected independent contractors to commit their time to her startup for "sweat equity" then that startup is deemed by the operator of the present invention to be more likely to succeed. By committing their valuable time, these respected independent contractors are effectively endorsing the startup. Using this information as additional input to improve the selection process is supported by a number of studies which show that the wisdom-of-the-crowd can be more effective at making decisions under uncertainty than a small number of experts. Consequently, adding the wisdom-of-the-crowd to expert opinion is expected to increase the success rate for selecting startups compared with a traditional seed stage venture capital selection process that relies on expert opinion alone. The present invention also enables organizations to create company pages that are stored in the Supplier Database 606. This enables organizations to display corporate information including information about their goals, mission, jobs, consulting assignments, projects, products, services, news, events, etc. Organizations that pay for a company page also get access to restricted information and services offered by the present invention. This includes access to feedback from startups on work assignments completed by independent contractors and the ability of company users to send messages to other users even when those other users have not accepted a connection request. Usually, users must send and accept connection requests before they can send messages to each other. Of course, users who have not established a formal connection with each other can inter-communicate via forums. The present invention also enables users to upload, into the CCS database 601, information about communal resources that they want to make available for use by other users. This information also includes the conditions of use for those communal resources. The communal resources include hardware and software, systems and modules, as well as services. Communal resources also include links to useful information, links to informative audio/video sources on the Internet and links to information about productivity tools. Opportunities include the option for independent contractors to sign up to provide services as beta testers, board members, early adopters, endorsers and focus group participants. These elections by each user are stored in that user's profile in the Contractor Database 605. When an entrepreneur needs a beta tester, board member, early adopter, endorser or focus group participant, he can search through the list of users who have opted in to provide these services. In addition, the business intelligence system is the means to match the requirements of the startups with the preferences of the independent contractors to match supply with demand for these opt in services. Other opportunities for independent contractors include the ability of users to offer communal assets that can be used by other users; the option for independent contractors to form ad-hoc teams to bid for projects posted by client companies on their company page; the option for client companies to post jobs on their company page and for users to apply for those jobs; and the option for recruiters or hiring companies to specify the candidate profile for a target job then the business intelligence system will seek independent contractors that match that profile. In this case, recruiters or hiring companies can specify the level of proficiency required for each target skill, such as communications, technical knowledge, decision making, etc. The business intelligence system will match the target skills profile with the actual skills profile stored in the Contractor Database 605 for each user. Each independent contractor can generate a skills profile by answering skill-based questions managed by the invention taught in co-owned patent application Ser. No. 15/089,553 (Apr. 3, 2016). This invention supports self-service questionnaires as well as facilitated interviews that generate a skills profile for the interviewee. The CCS is the present invention is operatively coupled to the CCS taught in co-owned patent application Ser. No. 15/089,553. When an independent contractor completes a work activity, or gig, for a startup, the entrepreneur provides feedback and also provides an excellence award in the form of a score. This excellence award is a personal work net promoter score, which indicates whether an entrepreneur would recommend that independent contractor to other entrepreneurs or potential clients and potential employers. After a client specifies their skills profile for a target job candidate they can also specify the target personal work net promoter score. Most job sites do not have actual work feedback about candidates or a personal work net promoter score to offer recruiters to supplement the candidate's standard resume. This is a clear and non-obvious advantage of the present invention over state of the art job sites. By way of comparison, the standard recruiting process is to post a job, receive resumes, filter candidates, interview, select then hire. The process offered by the present invention is to specify a target profile for a job candidate, automatically filter candidates based on matching their actual profiles to the target profile then interview and hire. The present invention also enables users to upload and recommend self-improvement and career advancement information to the CCS database from which other users can benefit. This information may include links to web sites, articles or other sources. Users can like, dislike, follow and unfollow these recommendations. This enables users to search for target recommendations, filter based on popularity then follow so they can receive alerts. The present invention also provides a shopping cart that includes group buying, startup launch deals offered by entrepreneurs, a product service exchange for users, a list of recommended suppliers, recommended apps and recommended apps that operate on the platform that is the present invention. The group buying option is the co-owned Utility Patent U.S. Pat. No. 8,548,868 which enables one user to write a purchase order for whatever they want to buy then other like-minded users can join their order to increase volume then suppliers compete in a reverse auction for the high volume purchase order.

In summary, a client can use its company page to input a target profile for a target candidate to hire. This profile can include a list of skills and the preferred percentage of the maximum possible score for each skill. Entrepreneurs can input requirements for work to be completed. Independent contractors can provide a solution, in the form of a work product, to one or more of these requirements. The entrepreneur can provide feedback in the form of an assessment of the work activity and an assessment of the performance of the independent contractor in completing the solution to the requirement. This feedback can include a personal work net promoter score which is a high level quantification of the feedback profile. The independent contractor also completes a skills survey using the system taught in co-owned patent application Ser. No. 15/089,553 (Apr. 3, 2016). This includes questionnaires comprised of multiple choice questions, whose answers can be scored automatically, and questionnaires comprised of non-multiple choice questions, whose answers require manual scoring or can be scored by an artificial intelligence procedure or bot. Acceptable bot solutions are taught in multiple disclosures including U.S. Pat. Nos. 7,249,117 B2, 8,818,926 B2, 7,861,252 B2. The calculated skills profile for each independent contractor is saved in their independent contractor's profile in the present invention as is the user's feedback that comprises that user's feedback profile. The client organization can search the list of independent contractors for candidates that match the client's target skills profile and feedback profile for a job and the business intelligence system can use multi-variate analyses, like a regression analysis, to identify automatically candidate profiles that are a good match to the client's target profile. This will create automatic candidate recommendations to the client based on the client's target skills profile and target personal work net promoter score. The client can then select the best candidates to interview and hire from a pre filtered list of matching candidates. In addition, the system operator can charge a higher fee for candidates that have higher skills profile scores and higher personal work net promoter scores.

The CCS 201 is operatively coupled to the Administrator Interface 202 which is the means for the system administrator to access the CCS. The CCS is operatively coupled to the entrepreneur interface 203 which is the means for an entrepreneur to access the CCS. The CCS is operatively coupled to the team member interface 204 which is the means for a team member to access the CCS. The CCS is operatively coupled to the independent contractor interface 205 which is the means for an independent contractor user to access the CCS. The CCS is operatively coupled to the supplier interface 206 which is the means for suppliers to access the CCS. The CCS is operatively coupled to the Data Storage System 207 that is the means to store the data used by the CCS. The CCS is operatively coupled to the Business Intelligence System 208 that is the means to match startups and independent contractors. The CCS is operatively coupled to the Notification Management System 209 that is the means to generate and send proactive and reactive notifications to users. For example, the CCS sends a notification to the entrepreneur when an independent contractor submits a request to provide support and send a notification to an independent contractor when an entrepreneur submits a request for support. The CCS also sends a notification to the system administrator when an entrepreneur submits a startup application then submits a notification to the entrepreneur when the system administrator approves or rejects the application. The CCS also sends a notification to the entrepreneur when an independent contractor submits a work order then submits a notification to the independent contractor when the entrepreneur approves or rejects the work order. The CCS also sends a notification to the independent contractor when the CCS awards bonus work units to the independent contractor and also when the fund provides options to the independent contractor. The CCS also sends a notification to the startup when an independent contractor offers bonus work units then submits a notification to the independent contractor when the startup approves or rejects the offer. The CCS also sends a notification to the entrepreneur when an independent contractor makes an excellence award then submits a notification to the independent contractor when the entrepreneur makes an excellence award. The CCS also sends a notification to the entrepreneur when an independent contractor, who is an accredited investor, makes a commitment to a campaign. The CCS also sends a notification to a supplier when a startup purchases the supplier's goods and services. The CCS also sends a notification to a user when someone adds a comment to a forum that the user is following. The CCS notifies independent contractors when an exchange, of fund interests, that they have requested has been approved and consummated. The CCS is operatively coupled to the encryption system 210 that is the means to encrypt and decrypt confidential information exchanged between users and between users and the CCS. The CCS is operatively coupled to the Authentication System 211 that is the means to authenticate a user's most confidential information, such as payment information. The CCS is operatively coupled to the Payment Processor System 212 that is the means to authorize and capture payments for the CCS. A payment authorization is an interrogation of the user's account to ensure the user has the means to pay. A payment capture is the final transfer of the funds from the source account to the destination account. The CCS is operatively coupled to the Administration System 213 that is the means to administer the CCS. The system administrator user logs into the CCS and configures parameters such as the meaning of each of the five stars in an excellence award. The system administrator user also enhances the CCS as new features are requested by users and implemented by the system administrator. The CCS is created using standard programming languages such as java, javascript, PHP, HTML, C, C+, and visual basic which is the means to enhance the CCS. The CCS can be hosted by a web host such as Godaddy or Host Gator. These web hosts are the means for the system administrator to administer the CCS. The web hosts offer a plurality of services such as backing up the databases, managing content pages using tools like Wordpress, and providing forum services. For example, GoDaddy enables clients to add forums to their website that lets web visitors create discussions and also post comments in discussion threads. The CCS is also the means for the system administrator to manage users who want to use the present invention and to manage trouble tickets that have been raised by users. The CCS is operatively coupled to the Workflow Management System 214 that is the means to manage the lean startup roadmap. The CCS is operatively coupled to the Messaging System 215 that is the means to facilitate communication among users, such as between entrepreneurs and independent contractors. The CCS is operatively coupled to the Forum System 216 that is the means to facilitate discussions among users about a specific topic. The user who creates the forum also moderates the forum.

The present invention has a plurality of potential revenue streams including future sales of shares in the startup, transaction fees for supplier sales via the shopping cart, subscription fees by startups, licensing fees for technologies, advertising, fees for company pages, recruitment commissions and the sale of trend information generated by the business intelligence system. Other income includes fees from professional services organizations who want to target startups and independent contractors. This include job agencies, insurance companies, law firms, accountants, software developers, etc. Payments can be made using a plurality of methods including credit cards, debit cards, electronic funds transfer, digital cash, checks and barter. In addition, a plurality of options exist for the timing of payments. It will be evident to one skilled in the art that one or more of the steps in the preferred procedure can be eliminated in specific situations without affecting the usefulness of the present invention.

As described above, company pages allow organizations to access feedback on work completed by independent contractors, send messages to users who are not connections, post projects, post jobs, post information about target job candidates, and post information about their company. A new use, and new functionality added to this disclosure, is an "accelerator as a service" feature. Organizations can create and sponsor a fund and can also view startup progress/status and startup value information. Each fund is valued by aggregating the value of all startups in that fund. The organization can input a multitude of information about a fund, including its start and end date, a list of startup companies in the fund's portfolio, information about the fund managers, and its focus on an industry, market, geographic region or cause. For example, an automobile company can sponsor a fund that invests in startups in the automobile industry. A lifestyle organization can sponsor a fund that invests in startups that serve a target market. A city, county or state can sponsor a fund that invests in startups that will locate in its geographic target area. A non-profit can sponsor a fund that invests in startups that serve the needs of a specific cause, such as voting technologies and procedures or community outreach. When an entrepreneur submits an application for their startup, they can specify the fund from which they want to receive the "sweat equity" investment. The present invention supports a plurality of funds. The organization who sponsors a fund can choose which startup applications to accept. Independent contractors then negotiate with entrepreneurs to provide work items for the accepted startups. The entrepreneur accepts the work item and provides feedback. In return for acceptance of the work item, the independent contractor receives a participation in the organization's sponsored fund, such as shares, share options or other considerations. The entrepreneur can input and update status information about their startup, including financial and other performance information that can be used to ascertain a valuation. The present invention processes this information in the BIS to calculate one or more estimates of the value for each startup in a fund, and by aggregation, a value for each fund. After a set period of time, such as three years, the organization can close their fund to new startups and float the fund on a financial market as a startup backed security. This allows all stakeholders in the fund to have the option to liquidate their shareholdings irrespective of the liquidity of the individual startups in the fund's portfolio. In total, the present invention allows the organization to receive the benefits of an accelerator without having to provide the usual investment dollars to fund startups and without incurring the annual costs to operate the accelerator. Rather, the organization leverages the present invention to meet the investment costs through sweat equity contributions from independent contractors. Also, the present invention meets the organization's annual accelerator operating costs as an extension of the present invention's normal operating costs. However, the sponsorship paid by the organization for the accelerator as a service feature is a new revenue stream for the present invention. The CCS 201 is the means of allowing organizations to create a fund and assign startups to that fund. The startup application process is described above. The process for independent contractors to provide services to startups and receive shares in the fund is described above. The CCS 201 is the means for Startups in a fund to input information, including certified financial information about their current commercial status. The BIS 208 is the means to analyze the financial information and estimate the value of each startup. The value information for startups is stored in the startup database 607. The value information for funds is stored in the CCS database 601. Other organizations can create company pages as described above to access this information and make their own value assessments for each startup in a fund's portfolio based on the status information for each startup, and in aggregate, make a value assessment about each fund. This is similar to calculating a value for a mortgage backed security then trading that security on a secondary market. A number of patent applications have been filed for systems that value companies, such as US20020174081A1 and US20040024674A1. Also, a number of patent applications have been filed for systems that support mortgage back securities, such as U.S. Pat. No. 8,694,399 B2 for pricing and US20100280937 A1 for trading. Anyone skilled in the art will recognize that similar methods can be applied to pricing and trading startup backed securities. The present invention interfaces with trading platforms that trade asset backed securities or, in this case, startup backed funds. These trading platforms are treated like an automated user by the present invention when they access valuation information for startups and funds. This enables users of the trading platform to trade shares in the fund which provides liquidity for fund shareholders even if the fund's startups are not liquid.

Anyone skilled in the art will also recognize that the method and apparatus of the present invention has many applications and advantages, and that the present invention is not limited to the representative examples and variations disclosed herein. In addition, the scope of the present invention covers conventional variations and modifications, to the components of the present invention, which are known to those who are skilled in the art.

I claim:

1. A computer implemented method for outsourcing a startup accelerator fund associated with an organization, said method comprising:
  receiving, from said organization, a first plurality of information to create said startup accelerator fund to invest in a plurality of startup businesses,
    wherein said startup accelerator fund comprises a first plurality of work units,
    wherein a work unit is a sweat equity investment from said startup accelerator fund into a startup business,
    wherein said startup business uses said work unit to pay for a sweat equity contribution from an independent contractor;
  receiving, from said startup business, an application to join said startup accelerator fund;
  receiving, from said organization, an approval of said application;
  transferring a second plurality of work units to said startup business as said sweat equity investment from said startup accelerator fund based on said approval, wherein said second plurality of work units is transferred from said first plurality of work units;
  receiving a requirement from said startup business to complete a deliverable based on said second plurality of work units;
  receiving, from said independent contractor, an estimate to complete said requirement;
  receiving, from said startup business, an acceptance of said estimate;
  receiving, from said startup business, an acceptance of said deliverable based on said acceptance of said estimate;
  receiving a feedback from said startup business including said acceptance of said deliverable;
  transferring, to said independent contractor, a third plurality of work units, from said second plurality of work units, based on said feedback;
  converting said third plurality of work units into a plurality of share options in said startup accelerator fund, whereby said organization signs up to a service that supports a plurality of startup accelerator funds;
  transmitting a non-confidential notification to a public email address of a user, based on an event, including a payment to said independent contractor, wherein a first confidential message associated with said event is transmitted to a secure email address of said user;
  securing a plurality of information based on, encrypting a confidential message, including said first confidential message, and decomposing an encrypted version of said confidential message into a block of linked subcomponents that are distributed randomly across a first plurality of member computers, wherein said plurality of information includes a plurality of authentication information and a plurality of authorization messages for a plurality of users and payments; and
  recovering said confidential message, by decrypting said encrypted version of said confidential message after recombining said encrypted version of said confidential message from its linked but randomly distributed subcomponents.

2. The method according to claim 1, wherein said third plurality of work units is a percentage of said first plurality of work units that comprise said startup accelerator fund.

3. The method according to claim 1, wherein said plurality of share options in said startup accelerator fund is at least one of an option to acquire a specific class of shares in said startup accelerator fund or an actual class of shares in said startup accelerator fund.

4. The method according to claim 1, wherein said feedback includes an assessment, from said startup business, of a plurality of work activities completed by said independent contractor.

5. The method according to claim 1, wherein said method further comprises:
  copying said block of linked subcomponents randomly to a second plurality of member computers to form a plurality of copies of said block of linked subcomponents;
  copying periodically an oldest block of linked subcomponents randomly to a third plurality of member computers to create a newest block of linked subcomponents; and
  deleting said oldest block of linked subcomponents after said creation of said newest block of linked subcomponents.

6. The method according to claim 5, wherein:
  securing said plurality of information, further comprises encrypting said confidential message based on at least one of a user's public encryption key and a symmetric encryption key; and
  recovering said confidential message, further comprises decrypting said encrypted version of said confidential message based on at least one of said user's private encryption key and said symmetric encryption key, wherein said user's private encryption key matches said user's public encryption key.

7. The method according to claim 6, wherein said user applies a first biometric signature to initiate a process that encrypts and decomposes said confidential message into said block of linked subcomponents and said user applies a second biometric signature to initiate a recovery of said confidential message from said block of linked subcomponents.

8. A system for outsourcing a startup accelerator fund associated with an organization, said system comprising:
  at least one memory configured to store computer program code instructions; and
  at least one processor configured to execute said computer program code instructions to:
    receive, from said organization, a first plurality of information to create said startup accelerator fund to invest in a plurality of startup businesses,
      wherein said startup accelerator fund comprises a first plurality of work units,
      wherein a work unit is a sweat equity investment from said startup accelerator fund into a startup business,
      wherein said startup business uses said work unit to pay for a sweat equity contribution from an independent contractor;
    receive, from a startup business, an application to join said startup accelerator fund;

receive, from said organization, an approval of said application;

transfer a second plurality of work units, to said startup business, as said sweat equity investment from said startup accelerator fund based on said approval, wherein said second plurality of work units is transferred from said first plurality of work units;

receive a requirement from said startup business to complete a deliverable based on said second plurality of work units;

receive, from said independent contractor, an estimate to complete said requirement;

receive, from said startup business, an acceptance of said estimate;

receive, from said startup business, an acceptance of said deliverable based on said acceptance of said estimate;

receive a feedback from said startup business including said acceptance of said deliverable;

transfer, to said independent contractor, a third plurality of work units, from said second plurality of work units, based on said feedback;

convert said third plurality of work units into a plurality of share options in said startup accelerator fund, whereby said organization signs up to a service that supports a plurality of startup accelerator funds;

transmit a non-confidential notification to a public email address of a user, based on an event, including a payment to said independent contractor, wherein a first confidential message associated with said event is transmitted to a secure email address of said user;

secure a plurality of information based on an encryption of a confidential message, including said first confidential message, and a decomposition of an encrypted version of said confidential message into a block of linked subcomponents that are distributed randomly across a first plurality of member computers, wherein said plurality of information includes a plurality of authentication information and a plurality of authorization messages for a plurality of users and payments; and recover said confidential message, by a decryption of said encrypted version of said confidential message after a recombination of said encrypted version of said confidential message from its linked but randomly distributed subcomponents.

9. The system according to claim 8, wherein said at least one processor is further configured to enable said third plurality of work units to be a percentage of said first plurality of work units that comprise said startup accelerator fund.

10. The system according to claim 8, wherein said at least one processor is further configured to enable said plurality of share options in said startup accelerator fund to be at least one of an option to acquire a specific class of shares in said startup accelerator fund and an actual class of shares in said startup accelerator fund.

11. The system according to claim 8, wherein said feedback includes an assessment, from said startup business, of a plurality of work activities completed by said independent contractor.

12. The system according to claim 8, wherein said at least one processor is further configured to:

copy said block of linked subcomponents randomly to a second plurality of member computers to form a plurality of copies of said block of linked subcomponents;

copy an oldest block of linked subcomponents periodically and randomly to a third plurality of member computers to create a newest block of linked subcomponents; and delete said oldest block of linked subcomponents after said creation of said newest block of linked subcomponents.

13. The system according to claim 12, wherein said at least one processor is further configured to:

encrypt said confidential message based on at least one of a user's public encryption key and a symmetric encryption key; and decrypt said encrypted version of said confidential message based on at least one of said user's private encryption key and said symmetric encryption key, wherein said user's private encryption key matches said user's public encryption key.

14. The system according to claim 13, wherein said at least one processor is further configured to enable said user to apply a first biometric signature to initiate a process to encrypt said confidential message then decompose it into said block of linked subcomponents and enable said user to apply a second biometric signature to initiate a recovery of said confidential message.

15. A non-transitory computer readable medium storing computer-executable instructions that, when executed by a processor, cause said processor to perform operations for outsourcing a startup accelerator fund associated with an organization, said operations comprising:

receiving, from said organization, a first plurality of information to create said startup accelerator fund to invest in a plurality of startup businesses,
    wherein said startup accelerator fund comprises a first plurality of work units,
    wherein a work unit is a sweat equity investment from said startup accelerator fund into a startup business,
    wherein said startup business uses said work unit to pay for a sweat equity contribution from an independent contractor;

receiving, from a startup business, an application to join said startup accelerator fund;

receiving, from said organization, an approval of said application;

transferring a second plurality of work units to said startup business as said sweat equity investment from said startup accelerator fund based on said approval, wherein said second plurality of work units is transferred from said first plurality of work units;

receiving a requirement from said startup business to complete a deliverable based on said second plurality of work units;

receiving, from said independent contractor, an estimate to complete said requirement;

receiving, from said startup business, an acceptance of said estimate;

receiving, from said startup business, an acceptance of said deliverable based on said acceptance of said estimate;

receiving a feedback from said startup business including said acceptance of said deliverable;

transferring, to said independent contractor, a third plurality of work units, from said second plurality of work units, based on said feedback;

converting said third plurality of work units into a plurality of share options in said startup accelerator fund, whereby said organization signs up to a service that supports a plurality of outsourced startup accelerator funds;

transmitting a non-confidential notification to a public email address of a user, based on an event, including a payment to said independent contractor, wherein a first confidential message associated with said event is transmitted to a secure email address of said user;

securing a plurality of information based on encrypting a confidential message, including said first confidential message, and decomposing an encrypted version of said confidential message into a block of linked subcomponents that are distributed randomly across a first plurality of member computers, wherein said plurality of information includes a plurality of authentication information and a plurality of authorization messages for a plurality of users and payments; and recovering said confidential message, by decrypting said encrypted version of said confidential message after recombining said encrypted version of said confidential message from its linked but randomly distributed subcomponents.

16. The non-transitory computer readable medium of claim 15, wherein said third plurality of work units is a percentage of said first plurality of work units that comprise said startup accelerator fund.

17. The non-transitory computer readable medium of claim 15, wherein said plurality of share options in said startup accelerator fund is at least one of an option to acquire a specific class of shares in said startup accelerator fund and an actual class of shares in said startup accelerator fund.

18. The non-transitory computer readable medium of claim 15, wherein said operations further comprise:

copying said block of linked subcomponents randomly to a second plurality of member computers to form a plurality of copies of said block of linked subcomponents;

copying an oldest block of linked subcomponents periodically and randomly to a third plurality of member computers to create a newest block of linked subcomponents; and deleting said oldest block of linked subcomponents after said creation of said newest block of linked subcomponents.

19. The non-transitory computer readable medium of claim 18, wherein said operations further comprise:

encrypting said confidential message based on at least one of a user's public encryption key and a symmetric encryption key; and decrypting said encrypted version of said confidential message based on at least one of said user's private encryption key and said symmetric encryption key, wherein said user's private encryption key matches said user's public encryption key.

20. The non-transitory computer readable medium according to claim 19, wherein said operations further comprise enabling said user to apply a first biometric signature to initiate a process to encrypt said confidential message then decompose it into said block of linked subcomponents and enabling said user to apply a second biometric signature to initiate a recovery of said confidential message.

* * * * *